(12) United States Patent  (10) Patent No.: US 9,026,235 B2
Fisher                     (45) Date of Patent: May 5, 2015

(54) AUTOMATION AND MOTION CONTROL SYSTEM

(71) Applicant: Tait Towers Manufacturing, LLC, Lititz, PA (US)

(72) Inventor: Scott Fisher, Las Vegas, NV (US)

(73) Assignee: Tait Towers Manufacturing LLC, Lititz, PA (US)

(*) Notice: Subject to any disclaimer, the term of this patent is extended or adjusted under 35 U.S.C. 154(b) by 0 days.

(21) Appl. No.: 14/105,472

(22) Filed: Dec. 13, 2013

(65) Prior Publication Data

US 2014/0180439 A1    Jun. 26, 2014

Related U.S. Application Data

(62) Division of application No. 13/476,370, filed on May 21, 2012, now Pat. No. 8,768,492.

(51) Int. Cl.
G05B 19/18 (2006.01)
A63J 99/00 (2009.01)
G05B 19/4061 (2006.01)
A63J 1/02 (2006.01)
G05B 15/02 (2006.01)
G05B 19/05 (2006.01)

(52) U.S. Cl.
CPC ............ *A63J 99/00* (2013.01); *G05B 19/4061* (2013.01); *G05B 2219/43173* (2013.01); *G05B 2219/33116* (2013.01); *G05B 2219/23416* (2013.01); *G05B 2219/33114* (2013.01); *G05B 2219/35585* (2013.01); *G05B 2219/36036* (2013.01); *G05B 2219/36171* (2013.01); *A63J 1/028* (2013.01); *G05B 15/02* (2013.01); *G05B 19/052* (2013.01); *G05B 2219/33273* (2013.01)

(58) Field of Classification Search
CPC .......... G05B 2219/43173; G05B 2219/33116; G05B 2219/23416; G05B 2219/33114; G05B 2219/35585; G05B 2219/36036; G05B 2219/36171; G05B 19/4061
USPC .......................................... 700/56, 61, 62, 63
See application file for complete search history.

(56) References Cited

U.S. PATENT DOCUMENTS

| 4,392,187 A |   | 7/1983  | Bornhorst |
| 4,710,819 A |   | 12/1987 | Brown |
| 4,947,302 A |   | 8/1990  | Callahan |
| 4,980,806 A |   | 12/1990 | Taylor et al. |
| 5,209,560 A |   | 5/1993  | Taylor et al. |
| 5,544,282 A | * | 8/1996  | Chen et al. ..................... 700/255 |

(Continued)

FOREIGN PATENT DOCUMENTS

| WO | 97/25661 A1 | 7/1997 |
| WO | 98/25197 A2 | 6/1998 |

(Continued)

OTHER PUBLICATIONS

XLNT Advanced Technologies Manufacturing BV, User Manual, Cyberhoist CH 1000/500/250 EU/US, Jan. 2009, Version 3, 32 pgs.

(Continued)

*Primary Examiner* — Ronald Hartman, Jr

(57) ABSTRACT

An automation and motion control system for theatrical objects, such as theatrical props, cameras, stunt persons, lighting, scenery, drapery or other similar types of devices or items, is provided to coordinate the movement of the objects on a large scale and/or to control the operation of the objects.

10 Claims, 19 Drawing Sheets

(56) References Cited

U.S. PATENT DOCUMENTS

| | | |
|---|---|---|
| 5,769,527 A | 6/1998 | Taylor et al. |
| 5,920,476 A | 7/1999 | Hennessey et al. |
| 5,923,132 A | 7/1999 | Boyer |
| 5,988,850 A | 11/1999 | Kumiya |
| 6,209,852 B1 | 4/2001 | George et al. |
| 6,297,610 B1 | 10/2001 | Bauer et al. |
| 6,421,579 B1 * | 7/2002 | Dimitri et al. ............. 700/214 |
| 6,442,442 B1 * | 8/2002 | Weinhofer ................. 700/86 |
| 6,459,919 B1 | 10/2002 | Lys et al. |
| 6,600,289 B2 | 7/2003 | George et al. |
| 6,643,563 B2 * | 11/2003 | Hosek et al. ............... 700/245 |
| 6,745,100 B1 * | 6/2004 | Lermuzeaux .............. 700/187 |
| 6,782,306 B2 * | 8/2004 | Yutkowitz ................. 700/189 |
| 6,873,355 B1 | 3/2005 | Thompson et al. |
| 7,080,824 B1 | 7/2006 | George et al. |
| 7,080,825 B1 | 7/2006 | George et al. |
| 7,130,716 B2 * | 10/2006 | Rogers et al. ............. 700/218 |
| 7,180,253 B2 * | 2/2007 | Weinhofer et al. ........ 318/34 |
| 7,529,599 B1 * | 5/2009 | Bhatt et al. ................ 700/250 |
| 7,627,394 B2 * | 12/2009 | Volcic et al. .............. 700/245 |
| 7,890,212 B2 * | 2/2011 | Cornett et al. ............. 700/264 |
| 7,971,856 B2 | 7/2011 | Kochan |
| 8,000,818 B1 * | 8/2011 | Bhatt et al. ................ 700/86 |
| 8,386,069 B2 * | 2/2013 | Hartmann et al. ......... 700/213 |
| 8,594,831 B2 * | 11/2013 | Zhao et al. ................. 700/182 |
| 2001/0047212 A1 * | 11/2001 | Hewlett et al. ............ 700/2 |
| 2003/0033050 A1 * | 2/2003 | Yutkowitz ................. 700/189 |
| 2005/0071021 A1 * | 3/2005 | Weinhofer ................. 700/63 |
| 2005/0273200 A1 * | 12/2005 | Hietmann et al. ......... 700/248 |
| 2007/0191966 A1 | 8/2007 | Fisher et al. |
| 2008/0314528 A1 | 12/2008 | Davis et al. |
| 2009/0015426 A1 | 1/2009 | Long et al. |

FOREIGN PATENT DOCUMENTS

| | | |
|---|---|---|
| WO | 02/10869 A1 | 2/2002 |
| WO | 2011079115 A1 | 6/2011 |
| WO | 2011079122 A1 | 6/2011 |

OTHER PUBLICATIONS

FTSI Automation, F315/F515 Self-Contained Flying Winches, 2 pages.

FTSI Automation, Navigator System, Software and Operator Interface Manual, Sep. 2009, Version 2.1, 320 pages.

* cited by examiner

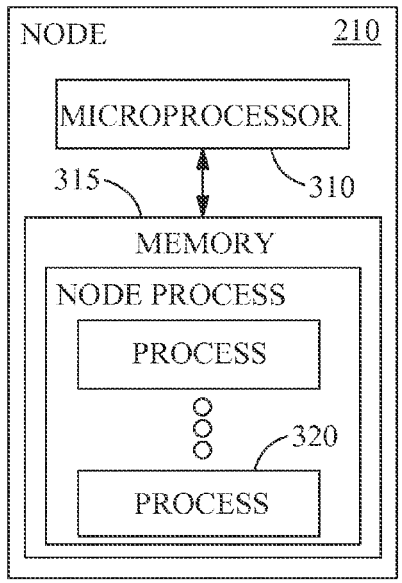
FIG. 3
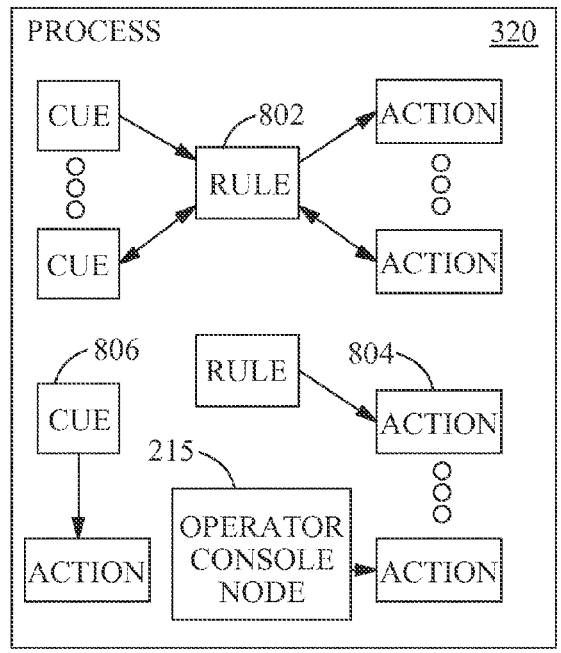
FIG. 8
| Network Device Manager | | | | | |
|---|---|---|---|---|---|
| Axis Vqnx | ⚠🚫 | 6 | | 2 | 192.168.50.17 |
| Estop Ford | ⚠🚫 | 3 | 1 | | 192.168.10.33 |
| New Server | ⚠ | 6 | | 2 | 192.168.10.11 |
| Server Inhouse 1 729 | 🚫 | 7 | | 8 | 192.168.10.250 |
| Server Inhouse 2 303 | 🚫 | 24 | | 39 | 192.168.10.248 |
| Server Navigator 010 | ⚠🚫 | 16 | | 2 | 192.168.10.10 |
| Server Tait Dev | ⚠🚫 | 7 | | | 192.168.50.88 |
| Vario Testing | ⚠ | 6 | | 2 | 192.168.50.18 |
| Vqnx 1 Bone | ⚠🚫 | 9 | | 2 | 192.168.50.10 |
| Vqnx 2 Kara | 🚫 | 10 | | 2 | 192.168.10.13 |
| Vqnx 3 Bward | 🚫 | 10 | | 1 | 192.168.50.12 |
| Vqnx 5 Stevescott | ⚠🚫 | 12 | 2 | 4 | 192.168.50.14 |
| Vqnx 6 Jared | 🚫 | 7 | | 1 | 192.168.50.15 |
| Vqnx 7 Cherb | 🚫 | 10 | | 2 | 192.168.50.16 |
| Vqnx 8 | ⚠🚫 | | | 8 | 192.168.50.17 |
| Vqnx N 8 | ⚠🚫 | 8 | | 2 | 192.168.50.8 |
402  406  412  408  410  404
FIG. 4

| Process Config - axis_vqnx/axis.1/CRM | | | |
|---|---|---|---|
| Threade Id | Name | axis_vqnx/axis.1-CRM [671770] | |
| | | Check Point | Check Point Msg |
| 1 | Service Main Thread | WAITTHREAD | Ended Event |
| 2 | Thread Recycler | WAIT | New Thread Event |
| 3 | Queued Writer | WAITTIME | New Queued Buffer Event |
| 4 | Process Info ResMgr | RUNNING | |
| 5 | Config Res Mgr | DISPBLOCK | |
| 7 | Config Saver | WAIT | Thread Resync Event |
| 6 | ResMgr Thread | DISPBLOCK | |

| Network Device Manager | | | | |
|---|---|---|---|---|
| axis_shop_ne | | 2 | 1 | 192.168.10.91 |
| axis.1 | AXIS_SHOP_NE | | | Running Axis |
| play.1 | Simple Player | | | Running Play |
| port.1 | | | | Disabled Port |
| axis_shop_nw | | 1 | 1 | 192.168.10.92 |
| axis.1 | AXIS_SHOP_NW | | | Running Axis |
| play.1 | | | | Disabled Play |
| axis_shop_se | | | 1 | 192.168.10.93 |
| axis_shop_sw | | | 1 | 192.168.10.94 |
| charybdis | | 38 | 23 | 192.168.10.12 |
| esc_s_13 | | | 3 | 192.168.10.134 |
| estop_shop_01 | | | 3 | 192.168.10.146 |
| estop_shop_03 | | | 3 | 192.168.10.135 |
| estop_shop_04 | | | 3 | 192.168.10.144 |
| i_o_9_6 | | | 1 | 192.168.10.166 |
| ioc_shop | | | 1 | 192.168.10.160 |
| server_beckhoff | | 23 | 2 | 192.168.10.3 |
| server_development | | 47 | 1 | 192.168.10.13 |
| axes.1 | Part 1 Lifts | | | Running Axes |
| axes.2 | Part 1 Tracks | | | Running Axes |
| axes.3 | Part 2 Lifts | | | Running Axes |
| axes.4 | Part 2 Tracks | | | Running Axes |
| axes.5 | Part 3 Lifts | | | Running Axes |
| axes.6 | Part 3 Tracks | | | Running Axes |
| axes.7 | Part 4 Lifts | | | Running Axes |
| axes.8 | Part 4 Tracks | | | Running Axes |
| axis.1 | [Lift 1.1] | | | Running Axis |
| axis.2 | [Lift 1.2] | | | Running Axis |
| axes.3 | [Lift 1.3] | | | Running Axis |
| axes.4 | [Lift 1.4] | | | Running Axis |
| axes.5 | [Track 1.1] | | | Running Axis |
| axes.6 | [Track 1.2] | | | Running Axis |
| axes.7 | [Track 1.3] | | | Running Axis |
| axes.8 | [Track 1.4] | | | Running Axis |
| axes.8 | [Lift 2.1] | | | Running Axis |

FIG.7

Rule Text
IF AXIS_SHOP_SE (axis_shop_se/axis. 1) velocitiy is greater than 5.0 ft/sec
THEN Disasble motion;
ON FAULT: Disasble motion.

| Process Threads | | | |
|---|---|---|---|
| axis_shop_nw/axis.1-AXIS[126994] | | | |
| 1 | Service Main Thread | WAITTIME | Ended Event |
| 2 | Thread Recycle | WAIT | New Thread Event |
| 3 | AsyncIO Notification Thread | WAIT | Data Available Event |
| 4 | AsyncIO Communication Thread | DISPBLOCK | |
| 5 | ProcInfoResource Mnaager | RUNNING | |
| 6 | Device Driver | WAITTIME | Thread Resync Event |
| 12 | Axis DAC | RUNNING | |
| 13 | AxisInfo Resource Manager | DISPBLOCK | |
| 7 | Rule Action Executor | WAIT | Thread Resync Event |
| 8 | Rule Manager Debouncing Filter | WAIT | Thread Resync Event |
| 9 | Driver Command Listener | WAIT | Thread Resync Event |
| 10 | Command Listener Dispatch | DISPBLOCK | |
| 11 | Config Listener | WAIT | Thread Resync Event |

| Process Counters | | |
|---|---|---|
| Display Format.. Show raw Data Shop_03/estop.1-ESTOP[126994] Started: 2005-10-17 14:47:5 | | |
| Device Performance | | |
| — Config Update Time, overall | 33ms 305us 859ns | 33ms 305us 859ns |
| — Config Parse Time | 5ms 353us 715ns | 5ms 353us 715ns |
| — Device Config Update, overall | 23ms 347us 111ns | 23ms 347us 111ns |
| — Device Config Update, pure | 23ms 258us 158ns | 23ms 258us 158ns |
| — Driver Config Update, overall | 0ns | 0ns |
| — Driver Config Update, pure | 4ms 976us 399ns | 4ms 976us 399ns |
| — Wrapper Config Update, overall | 0ns | 0ns |
| — Wrapper Config Update, pure | 6ms 009us 549ns | 6ms 009us 549ns |
| — History Config Update | 81us 579ns | 81us 579ns |
| — History OneEntry Create Time | 0ns | 0ns |
| — Rule Mgr Config Update, overall | 12ms 042us 076ns | 12ms 042us 076ns |
| — Device Status File Upd Time | 276us 005ns | 274us 769ns |
| — Device DataVector Create Time | 0ns | 0ns |
| — Wrapper Data File Upd Time | 13us 237ns | 18us 925ns |
| — Wrapper Wait Data Done Time | 0ns | 0ns |
| Wrapper Status File Upd Time | 377us 368ns | 192us 024ns |
| Command State File Upd Time | 0ns | 0ns |
| Set Drv Error Time | 16us 676ns | 16us 572ns |
| — Command Listener Latency | 0ns | 0ns |
| Device Files Status | | 1 |
| Device Command Statistics | | |
| Device Startup Performance | | |
| AsyncIO State | | 1 |
| Object Monitor Performance | | |
| Allocated Objects | | |
| Kernel Objects | | |
| Memory Allocated | | |

| Process Counters | | | | |
|---|---|---|---|---|
| Display Format.. Reset Show Raw Data | | Started 2011-11-23 14:48:27.740 | | |
| Name | Avg | Last | Min | Max |
| Resource Manager Statistics | | | | 3 |
| – Opened Files | | 2 | 1 | 4 |
| – Opened Files For Writing | | 0 | 0 | 1 |
| – Open Errors | | 0 | 0 | 0 |
| – Blocked Reads | | 1 | 1 | 2 |
| – Blocked Writes | Counter | 0 | 0 | 1 |
| – Pulses Sent | Name: Open Errors | 6 | 1 | 6 |
| – Time In Open | Avg: 0 | 58us 733ns | 46us 042ns | 1ms 517us |
| – Time In Read | Min: 0 Max: 0 | 2us 959ns | 2 us 174ns | 1ms 695us |
| – Time In Write | 0ns | 0ns | 0ns | 0ns |
| – Time In Close | 14us 809ns | 7us 787ns | 7us 787ns | 18us 629ns |
| – Request Wait Time | 0ns | 0ns | 0ns | 0ns |
| – Latency Period | 0ns | 0ns | 0ns | 0ns |
| – Pulses Attached | 2 | 2 | 2 | 2 |
| – Server Key Slots Used | 1 | 1 | 1 | 1 |
| – Server Key Slots Exhausted | | | | 0 |
| Object Monitor Performance | | | | |
| – Set State Overall Time | 54ns | 54ns | 54ns | 54ns |
| – Set State Monitor Time | 0 | 0 | 0 | 0 |
| – Get State Overall Time | 0 | 0 | 0 | 0 |
| – Get State Monitor Time | 0 | 0 | 0 | 0 |
| – Reg. Notif. Overall Time | 0 | 0 | 0 | 0 |
| – Reg. Notif. Monitor Time | 0 | 0 | 0 | 0 |
| – Load Nodelist Overall Time | 0 | 0 | 0 | 0 |
| – Load Notelist Monitor Time | 0 | 0 | 0 | 0 |
| – Notifiaction Callback Time | 0 | 0 | 0 | 0 |
| – Report Status Time | 0ns | 0ns | 0ns | 0ns |
| Allocated Objects | | | | |
| – CMultirefCharBuf | 0 | 0 | 0 | 0 |
| – string | 0 | 0 | 0 | 0 |
| – CAppStopableThread | 0 | 0 | 0 | 0 |
| – CBaseEntry | 0 | 0 | 0 | 0 |
| – CDeviceEntry | 0 | 0 | 0 | 0 |
| – CXMLDOMNode | 0 | 0 | 0 | 0 |
| Kernel Objects | | | | |
| – Mutexes Allocated | | | | |
| – Conditional Variables Alllocated | | | | |
| Memory Allocated | | | | |
| Total | | | | |
| Thread 1 | | | | |

| Name | Type | Value |
|---|---|---|
| Actual Position | float | 0.00016 |
| Actual Velocity | float | 0.0 |
| PositionError | float | 0.0 |
| TargetTime | float | 0.0 |
| TargetPosition | float | 100.00016 |
| CmdPosition | float | 0.00016 |
| JogVelocity | float | 0.0 |
| CmdVelocity | float | 0.0 |
| Acc | float | 0.0 |
| CmdAcc | float | 0.0 |
| Jerk | float | 0.0 |
| CmdJerk | float | 0.0 |
| Status | dword | 00001018 |
| [Enabled, homed, Move, Rdy] | | |
| Limits | dword | 00430000 |
| [HW Enabled, Rule Enabled, Soft Enabled] | | |
| HW_Bits | dword | 27000000 |
| [Brake Breaker Sens, Drive Breaker sens, Drive Contact Sens, Drive Ready Sens] | | |
| Bypasses | dword | 00000000 |
| [ ] | | |
| ControlSource | string | server_tait_dev/play.1 |
| JogSources | string | |
| JogValueSource | string | |
| JogActiveSource | string | |
| JogActiveCondDef | string | |
| JogType | dword | 00000000 |
| [ ] | | |
| JogValueSourceTS | string | |
| JogActiveSourceTS | string | |
| JogActiveCondDefTS | string | |
| JogValueSourceLim | string | |
| JogActiveSourceLim | string | |
| JogActiveCondDefLim | string | |
| RulesState | string | 3: 1,4: 1 |
| RulesDisSrc | string | |
| DrvTiming | string | |
| DrvPostInt | int | 25 |
| AbsPosInt | int | 1 |
| CmdTimeScale | float | 100.0 |
| TimeScale | float | 100.0 |

| Motion Path Nodes Editor | | | |
|---|---|---|---|
| ☐ Absolute Coordinates ☐ Preview Position/Velocity | | | |
| Object Position   Capture Points | | | |
| X -4.362   Add     New Profile | | | |
| Y 9.464    Insert | | | |
| Z 0.319    Modify | | | |
| Time, sec | Alpha, rot | Y, ft | Gamma, rot |
| 0.0 | 0.0 | 9.5 | 0.0 |
| 2.5 | 15.0 | 9.5 | 0.0 |
| 5.0 | 0.0 | 9.5 | 15.0 |
| 7.5 | -15.0 | 9.5 | 0.0 |
| 10.0 | 0.0 | 9.5 | -15.0 |
| 12.0 | 15.0 | 9.5 | 0.0 |
| 14.0 | 0.0 | 9.5 | 15.0 |
| 16.0 | -15.0 | 9.5 | 0.0 |
| 18.0 | 0.0 | 9.5 | -15.0 |
| 20.0 | 15.0 | 9.5 | 0.0 |
| 21.5 | 0.0 | 9.5 | 15.0 |
| 23.0 | -15.0 | 9.5 | 0.0 |
| 24.5 | 0.0 | 9.5 | -15.0 |
| 26.0 | 15.0 | 9.5 | 0.0 |
| 27.0 | 0.0 | 9.5 | 15.0 |
| 28.0 | -15.0 | 9.5 | 0.0 |
| 29.0 | 0.0 | 9.5 | -15.0 |
| 30.0 | 15.0 | 9.5 | 0.0 |
| 31.0 | 0.0 | 9.5 | 15.0 |
| 32.0 | -15.0 | 9.5 | 0.0 |
| 33.0 | 0.0 | 9.5 | -15.0 |
| 34.0 | 15.0 | 9.5 | 0.0 |
| 35.0 | 0.0 | 9.5 | 15.0 |
| 36.0 | -15.0 | 9.5 | 0.0 |
| 37.0 | 0.0 | 9.5 | -15.0 |
| 38.0 | 15.0 | 9.5 | 0.0 |
| 39.0 | 0.0 | 9.5 | 15.0 |
| 40.0 | -15.0 | 9.5 | 0.0 |
| 41.0 | 0.0 | 9.5 | -15.0 |
| 42.0 | 15.0 | 9.5 | 0.0 |
| 43.0 | 0.0 | 9.5 | 0.0 |
| Extension Axis Profiles | | | |
| Material | | | |

FIG. 24

| Object Profile Editor | | | | | |
|---|---|---|---|---|---|
| Profiles | | | | | |
| Type | | | | Use Before | Use After |
| Translation Motion | | | | ☐ | ☐ |
| Rotation Motion | | | | ☐ | ☐ |

| Time | X | Y | Z |
|---|---|---|---|
|  | 0 | 0 | 4 |
| 1.13636374473572 | 3 | 0 | 3 |
| 2.27272748947144 | 4 | 0 | 0 |
| 3.40909123420715 | 3 | 0 | -3 |
| 4.54545497894287 | 0 | 0 | -4 |
| 5.68181848526001 | -3 | 0 | -3 |
| 6.81818246841431 | -4 | 0 | 0 |
| 7.95454597473145 | -3 | 0 | 3 |
| 9.09090995788574 | 0 | 0 | 4 |
| 9.94318199157715 | 3 | 0 | 3 |
| 10.7954549789429 | 4 | 0 | 0 |
| 11.6477270126343 | 3 | 0 | -3 |
| 12.5 | 0 | 0 | -4 |
| 13.352272983657 | -3 | 0 | -3 |
| 14.2045459747314 | -4 | 0 | 0 |
| 15.0568189620972 | -3 | 0 | 3 |
| 15.9090919494629 | 0 | 0 | 4 |
| 16.47727394104 | 3 | 0 | 3 |
| 17.0454540252686 | 4 | 0 | 0 |
| 17.6136379241943 | 3 | 0 | -3 |
| 18.1818199157715 | 0 | 0 | -4 |
| 18.75 | -3 | 0 | -3 |
| 19.3181838989258 | -4 | 0 | 0 |
| 19.8863639831543 | -3 | 0 | 3 |
| 20.4545459747314 | 0 | 0 | 4 |
| 21.022727279663086 | 3 | 0 | 3 |
| 21.590909099578857 | 4 | 0 | 0 |
| 22.1590919494629 | 3 | 0 | -3 |
| 22.72727394104 | 0 | 0 | -4 |
| 23.2954540252686 | -3 | 0 | -3 |
| 23.8636379241943 | -2 | 0 | 0 |
| 24.4318199157715 | -1.5 | 0 | 1.5 |
| 25 | 0 | 0 | 2 |

FIG. 25

AUTOMATION AND MOTION CONTROL SYSTEM

CROSS-REFERENCE TO RELATED APPLICATIONS

This application is a divisional of U.S. application Ser. No. 13/476,370, filed May 21, 2012, entitled AUTOMATION AND MOTION CONTROL SYSTEM, which application is hereby incorporated by reference in its entirety.

BACKGROUND

The application generally relates to an automation and motion control system. The application relates more specifically to an automation and motion control system for the entertainment industry that uses a distributed control model and independent nodes.

In the entertainment industry, to provide a realistic atmosphere for a theatrical production, theatrical objects or components can be moved or controlled by an automation and motion control system during (and between) scenes on a stage or takes on a motion picture production set. Automation of the movement and control of the theatrical objects or components is desirable for safety, predictability, efficiency, and economics. Prior theatrical object movement and control systems provided for the control and movement of the theatrical objects or components under the control of a central computer or microprocessor. The prior movement and control systems controlled a large number of devices using lists of sequential actions or instructions that were executed by the central computer. For example, the motorized movement of the objects could be provided by drive motors, which may or may not use variable speed drives, coupled to the central computer, possibly through one or more intermediate controllers. The prior theatrical object movement and control systems used a hierarchical order with a definite progression from operator controls to data network to control device to field device.

One drawback to the centralized control of multiple components is that as the number of components in a particular system increases, the processing power or capability of the central controller and the central controller's corresponding communication bandwidth has to likewise increase in order to be able to provide the appropriate control instructions to the components. If the central controller cannot process or transmit the information and instructions fast enough, the components may not perform as expected and/or safety risks could be introduced that could cause damage or injury to both people and property.

Other prior theatrical object movement and control systems use separate subsystems, each having a programmable logic controller (PLC), to handle the control of device functionality. When using PLCs, the operator has to monitor the system via separate inputs from the separate subsystems and then take separate actions for each of the subsystems.

Therefore, what is needed is a control system for a theatrical production that does not use a central controller for processing, but instead distributes the processing load among multiple independent nodes while operating within a single system.

SUMMARY

The present application is directed to an automation and motion control system to control a plurality of theatrical objects. The control system includes a plurality of nodes in communication with each other over a real time network. Each node of the plurality of nodes corresponds to at least one item equipment used to a control a theatrical object. Each node of the plurality of nodes includes a microprocessor and a memory device. The memory device includes a node process and at least one process executable by the microprocessor. The at least one process is used to control the operation of the at least one item of equipment. The at least one process has one or more of cues, rules and actions to generate the control instructions to control the operation of the at least one item of equipment.

The present application is also directed to a control system to move an object. The control system includes an operator console node enabled to permit an operator to interact with the control system and a plurality of axis nodes. Each axis node of the plurality of axis nodes has a microprocessor and is associated with an item of equipment used to move an object in a predefined space. The control system includes a space device having a display device enabled to display movement of the object in the predefined space, a first operator interface enabled to permit an operator to define a movement path for the object in the predefined space, and a second operator interface enabled to permit an operator to define the relationship between the object and a plurality of engines used to move the object. The movement path adjusts both the position of the object and the orientation of the object. Each engine of the plurality of engines corresponding to an axis node of the plurality of axis nodes. The space device provides the defined movement path for the object and the relationship between the object and the plurality of engines to at least one axis node the plurality of axis nodes. The at least one axis node the plurality of axis nodes processing the defined movement path for the object and the relationship between the object and the plurality of engines to generate one or more control instructions to control operation of the item of equipment to move the object along the defined movement path.

The present application is further directed to a computer implemented method to control the movement of an object in a predefined space. The method includes establishing a starting point for an object in a predefined space. The starting point defining a position and an orientation of the object in the predefined space. The method includes determining a motion profile for the object. The motion profile being used to move the object along a path beginning at the starting point and the motion profile having a position and an orientation for the object at each point along the path. The method also includes converting the motion profile into a plurality of control instructions for at least one component used to move the object along the path and executing the plurality of control instructions by the at least one component to move the object along the path.

One embodiment of the present application includes a theatrical objects automated motion control system, program product, and method that provides, in various implementations, techniques for large scale motion and device control. Non-hierarchical theatrical object movement techniques are provided to permit combinations of multiple devices on a network to function as would a single machine. Full-function scalability is provided from one to many machines, wherein neither processor nor device boundaries exist but rather each device has the option of exchanging its operational data with any other device at any time, in real time. Techniques are provided for coordinating the movement and control of objects, e.g., theatrical props, cameras, stunt persons (e.g., "wirework"), lighting, scenery, drapery and other equipment, during a performance at a venue, e.g., a theater, arena, concert hall, auditorium, school, club, convention center and television studio.

In one exemplary implementation, the control system can coordinate the moving of objects about a venue during a live performance, e.g., a theatrical performance on a stage, and/or during the filming of a scene for a television or movie production. Such venues can employ machines, such as winches, hoists, battens, or trusses, to move the various objects relative to a stage or floor. By controlling the movement of the objects with the control system, the safety of the actors can be better ensured and the movement of the objects or actors can seem more realistic.

As an example, a theatrical performance may call for a battle scene. In the battle, a first stunt person is to fly through the air and then collide with a second stunt person, where the second stunt person is struck so hard that the second stunt person is thrown backward into and through a wall. To set up this stunt, each of the first and second stunt persons is hung from respective cables. Each cable is attached to a separate winding mechanism powered by an electrical motor, for instance, a winch. In the stunt, the first stunt person falls while attached to a cable towards the second stunt person. The winch stops the cable, and the first stunt person's movement, just as the first stunt person hits the second stunt person. While not seen by the audience, each person wears some padding so that their minor impact will not hurt either person. The second winch is synchronized (with the first winch) to pull on the cable attached to the second stunt person so hard that it appears that the second stunt person has been struck by the first stunt person. The second winch then continues to pull the second stunt person's cable until the second player's body hits an easily breakable wall. Finally, the second winch stops the second stunt person's cable when the second stunt person's body has passed through the easily breakable wall. The control system can be used to control the coordination of the winding and reeling between the first and second winches to ensure the safety of the stunt persons.

One advantage of the present application is that it is scalable and configurable to accommodate both simple systems with very few objects and complex systems with multiple subsystems each having many objects.

Another advantage of the present application is that the user interface is configurable to display only the information required by the operator, at the level of detail required by the operator.

Still another advantage of the present application is the capability for real time operation and/or implementation of motion control systems, safety systems, I/O devices, show control functions, industrial protocols, DMX systems, SMPTE systems, VITC systems, and 3D environment constructions and controls from different manufacturers.

Yet another advantage of the present application is that operators can configure the system's capabilities to satisfy their current needs, but can expand the system capabilities as required.

A further advantage of the present application is the inclusion of specific capabilities and features associated with different areas of the entertainment industry, from theaters to theme parks to motion picture productions and stunts.

One advantage of the present application is the distribution of the control processing load among several controllers that can reduce the processing power required of any one controller and enable more cost effective controllers to be used.

Another advantage of the present application is the use of rule functions or groups by a component controller to respond to an action or event occurring at another component without receiving an instruction from a central controller.

Still another advantage of the present application is that a component controller can perform self-monitoring functions with respect to preselected safety and accuracy parameters.

A further advantage of the present application is the ability of a component controller to function autonomously without having to receive global control instructions.

One advantage of the present application is that the control system has a structural organization that permits any type of device to be built while maintaining the same operational paradigm, thereby enabling all devices to exchange information.

Another advantage of the present application is the ability for real-time monitoring of systems, failure detection and a simplified, but multi-layered, safety system that features both rules and integrated e-stop controls.

A further advantage of the present application is that it can display data about cues, machines in motion, machines on e-stop, status of the machines to be used on the next cue or any alerts generated from sensors incorporated in the system.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

FIG. 3 schematically shows an exemplary embodiment of a node from the automation and motion control system.

FIGS. 4 and 5 show exemplary embodiments of screen displays from the control system identifying nodes.

FIGS. 6 and 7 shows exemplary embodiments of screen displays from the control system identifying associated processes for select nodes.

FIG. 8 schematically shows an exemplary embodiment of a sub- or co-process of a node process.

FIGS. 11 and 12 show exemplary embodiments of screen displays from the control system identifying associated threads for a process.

FIGS. 13 and 14 show exemplary embodiments of screen displays from the control system showing performance data.

FIG. 15 shows an exemplary embodiment of a screen display from the control system showing a table corresponding to a data vector that is shared with other devices.

FIGS. 21 and 22 show exemplary embodiment of different interfaces for entering a point to point motion profile into a three dimensional motion system.

FIGS. 24 and 25 show exemplary embodiments of different editors for entering motion profiles for a three dimensional motion system.

Wherever possible, the same reference numbers are used throughout the drawings to refer to the same or like parts.

DETAILED DESCRIPTION OF THE EXEMPLARY EMBODIMENTS

Figure 1:
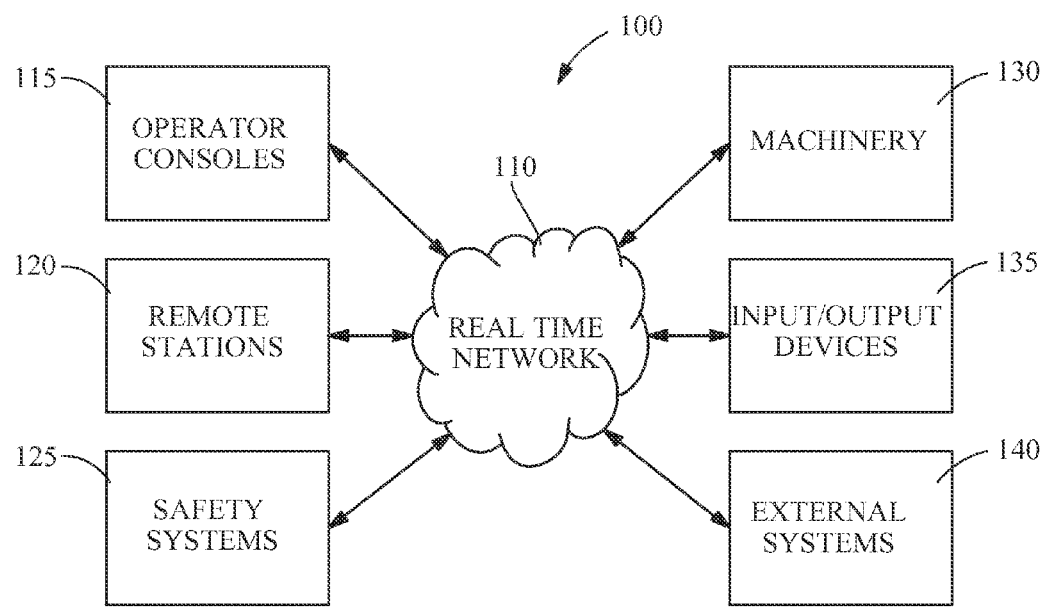
FIG. 1 schematically shows an exemplary embodiment of an automation and motion control system.

FIG. 1 shows an exemplary embodiment of the automation and motion control system of the present application. The automation and control system 100 can include a real time network 110 interconnecting operator consoles 115, remote stations 120, safety systems 125, machinery 130, input/output devices 135 and external systems 140. In one exemplary embodiment, safety systems 125 can include emergency stop (e-stop) systems; machinery 130 can include lifts, chain hoists, winches, elevators, carousels, turntables, hydraulic systems, pneumatic systems, multi-axis systems, linear motion systems (e.g., deck tracks and line sets), audio devices, lighting devices, and/or video devices; input/output devices 135 can include incremental encoders, absolute encoders, variable voltage feedback devices, resistance feedback devices, tachometers and/or load cells; and external systems 140 can include show control systems, industrial protocols and third party software interfaces including 0-10 V (volt) systems, Modbus systems, Profibus systems, ArtNet systems, BMS (Building Management System) systems, EtherCat systems, DMX systems, SMPTE (Society of Motion Picture and Television Engineers) systems, VITC systems, MIDI (Musical Instrument Digital Interface) systems, MANET (Mobile Ad hoc NETwork) systems, K-Bus systems, Serial systems (including RS 485 and RS 232), Ethernet systems, TCP/IP (Transmission Control Protocol/Internet Protocol) systems, UDP (User Datagram Protocol) systems, ControlNet systems, DeviceNet systems, RS 232 systems, RS 45 systems, CAN bus (Controller Area Network bus) systems, Maya systems, Lightwave systems, Catalyst systems, 3ds Max or 3D Studio Max systems, and/or a custom designed system.

Figure 2:
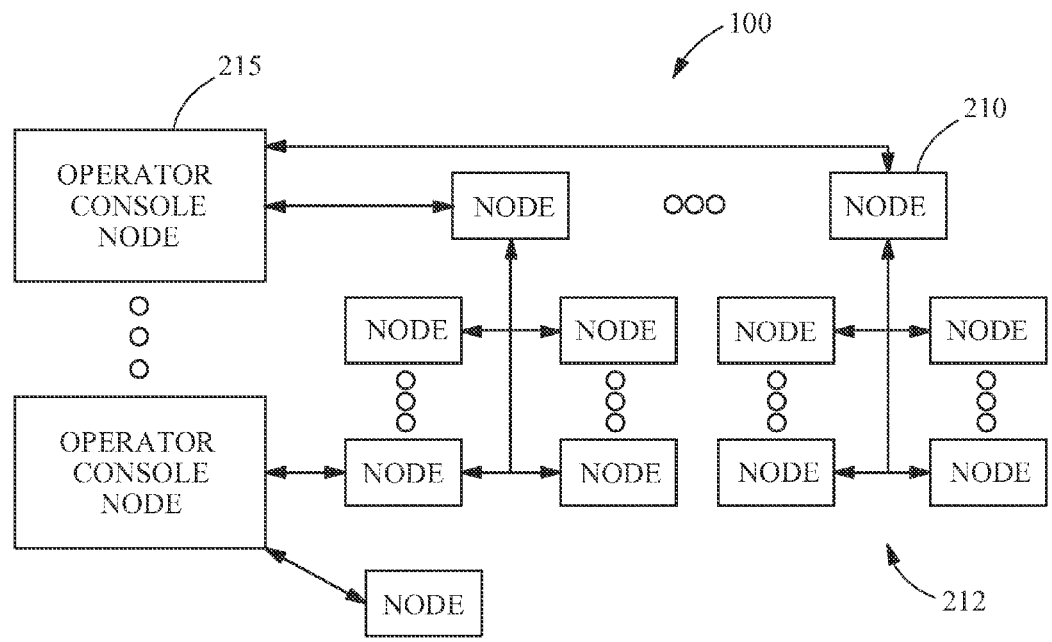
FIG. 2 schematically shows an alternate embodiment of an automation and motion control system.

FIG. 2 shows an alternate embodiment of the automation and motion control system. The automation and motion control system 100 shown in FIG. 2 can be formed from the interconnection of logical nodes 210. Each node 210 can be a specific device (or group of devices) from remote stations 120, safety systems 125, machinery 130, input/output devices 135 and external systems 140. An operator console node 215 can be a specific device from operator consoles 115 and can enable an operator to interact with the control system 100, i.e., to send data and instructions to the control system 100 and to receive data and information from the control system 100. The operator console node 215 is similar to the other nodes 210 except that the operator console node 215 can include a graphical user interface (GUI) or human-machine interface (HMI) to enable the operator to interact with the control system 100. In one exemplary embodiment, the operator console node 215 can be a Windows® computer.

In one exemplary embodiment, the operator(s) can make inputs into the system at operator console nodes 215 using one or more input devices, e.g., a pointing device such as a mouse, a keyboard, a panel of buttons, or other similar devices. As shown in FIG. 2, nodes 210 and operator console nodes 215 are interconnected with each other. Thus, any node 210, 215 can communicate, i.e., send and receive data and/or instructions, with any other node 210, 215 in the control system 100. In one exemplary embodiment, a group of nodes 210 can be arranged or configured into a network 212 that interconnects the nodes 210 in the group and provides a reduced number of connections with the other nodes 210, 215. In another exemplary embodiment, nodes 210, 215 and/or node networks 212 can be interconnected in a star, daisy chain, ring, mesh, daisy chain loop, token ring, or token star arrangement or in combinations of those arrangements. In a further exemplary embodiment, the control system 100 can be formed from more or less nodes 210, 215 and/or node networks 212 than those shown in FIG. 2.

In one exemplary embodiment, each node 210, 215 can be independently operated and self-aware, and can also be aware of at least one other node 210, 215. In other words, each node 210, 215 can be aware that at least one other node 210, 215 is active or inactive (e.g., online or offline).

In another exemplary embodiment, each node is independently operated using decentralized processing, thereby allowing the control system to remain operational even if a node may fail because the other operational nodes still have access to the operational data of the nodes. Each node can be a current connection into the control system, and can have multiple socket connections into the network, each providing node communications into the control system through the corresponding node. As such, as each individual node is taken "offline," the remaining nodes can continue operating and load share. In a further exemplary embodiment, the control system can provide the operational data for each node to every other node all the time, regardless of how each node is related to each other node.

FIG. 3 schematically shows an exemplary embodiment of a node. Each node 210 (or operator console node 215) includes a microprocessor 310 and a memory device 315. The memory device 315 can include or store a main or node process 317 that can include one or more sub- or co-processes 320 that are executable by the microprocessor 310. The main or node process 317 provides the networking and hardware interfacing to enable the sub- or co-processes to operate. The microprocessor 310 in a node 210, 215 can operate independently of the other microprocessors 310 in other nodes 210, 215. The independent microprocessor 310 enables each node 210, 215 in the control system 100 to operate or function as a "stand-alone" device or as a part of a larger network. In one exemplary embodiment, when the nodes 210, 215 are operating or functioning as part of a network, the nodes 210, 215 can exchange information, data and computing power in real time without recognizing boundaries between the microprocessors 310 to enable the control system 100 to operate as a "single computer." In another embodiment, each node may use an embedded motion controller.

Figure 5:
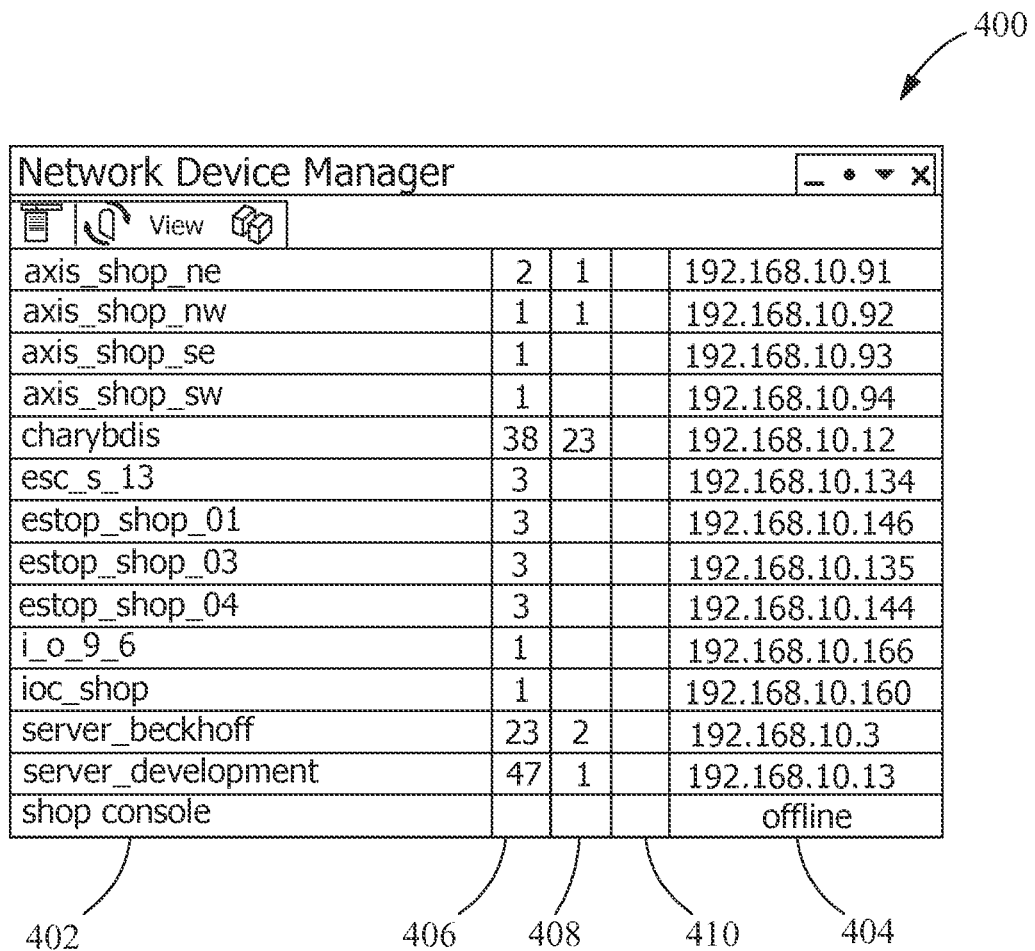

FIGS. 4 and 5 show exemplary embodiments of node lists displayed by the control system. The interactive screen shots or displays shown in FIGS. 4 and 5 use a table 400 to identify all of the nodes in the control system 100 that are visible to an operator at an operator console 215. The table 400 provides an overview of the nodes in the control system 100 and permits an operator to view what is going on in the control system 100 from an operator console 215. The table 400 permits an operator to look at all the different nodes, the addresses of the different nodes, what the different nodes are doing, how many processes the different nodes are executing, and any inter-node communications.

In table 400, the names of the nodes are provided in column 402. Each node in column 402 can include a computing device such as a process controller, a thin client, a palm top computer, single board computer (SBC), programmable logic controller (PLC), field programmable gate array (FPGA) device or a microprocessor, or the node can be a software device like a "player" or a "virtual machine" which is not a tangible piece of machinery capable of being held in one's hand but is instead a software construct that is considered by the control system to be a device. The software device can supply commands and receive back a status, yet doesn't exist as a physical device. In an exemplary embodiment, each node, whether a computing device or a software device, can execute the QNX real time operating system.

In one exemplary embodiment, the table 400 can include one or more "axis" devices or nodes. The "axis" device or node can be used represent any piece of machinery that moves an object. The machinery can be operated by hydraulic, electric, or pneumatic systems. The control system can be used with a variety of different axis devices or nodes that correspond to the controllers for the end machines that make theatrical objects move. Examples of axis machinery can include engines, motors (AC/DC), servos, hydraulic movers, and pneumatic movers.

The network address or internet protocol (IP) address for each device or node is provided in column 404. If the device or node is offline, e.g., "unplugged" or "not hooked up," then column 404 can provide "offline" as the network address for the device or node (see FIG. 5) or a network address can be provided for the device or node but an additional indicator is used, e.g., highlighting, to indicate that the device or node is offline (see FIG. 4).

In one exemplary embodiment, when the control system for a stage production is started and operating, one of more nodes can join, i.e., change from "offline" to "online" or "active" at any point in time during the production. During the production, there can be times when a theatrical object is not to be moved at all during the production, in which case a node corresponding to that theatrical object can be taken offline so there is no way that the object can be moved or the node brought online accidentally. When the offline node is intentionally brought back online either automatically or as a result of an operator command, the node sends a universally available data vector announcing that it is back online.

In another exemplary embodiment, when a node or device is disabled or offline, e.g., is known and displayed, but not operational, the effect is that the node or device is no longer available to the control system for operation. The IP or network address for the node or device would be displayed in column 404 when the node or device is taken offline, if the IP or network address was known by the control system. If a sub- or co-process for the node or device failed or terminated, which may indicate that a software problem has occurred, the corresponding node or device can still be listed in column 404. In another exemplary embodiment, color can be used in table 400 to provide a variety of diagnostic messages to an operator, e.g., black is online or active and yellow is offline or no sub- or co-processes are installed in the node or device.

The number of different active sub- or co-processes executing on each node or device can be shown or indicated in column 406 of table 400. For example, the "charydbidis" node or device shown in FIG. 5 has 38 sub- or co-processes running simultaneously. Column 408 of table 400 shows or indicates the number of sub- or co-processes that are installed on the corresponding device or node but are disabled. In the embodiment shown in FIG. 4, the number of stopped or faulted sub- or co-processes on a node or device is shown or indicated in column 412. The total of sub- or co-processes in column 406, column 408 and column 412 (if present) in a row show or indicate the total sub- or co-processes on a node. Column 410 of table 400 shows or indicates the number of sub- or co-process in an offline node or device.

In the exemplary embodiment shown in FIG. 5, four directional axis nodes or devices ("axis_shop_ne," "axis_shop_nw," "axis_shop_se," and "axis_shop_sw") can each represent a computing device that controls a respective winch at four different corners of a theatrical environment (e.g., a stage), where the winch cables all converge to a single point so as to provide a three dimensional (3-D) movement system to move the single point around in the 3-D space. The "esc_s_13" node or device and the "estop" nodes or devices can be emergency stop controllers that can prevent theatrical objects from colliding in response to an operator pushing an emergency stop button. When the emergency stop button is pushed, the power can be removed from the corresponding machine or simultaneously from all machines and then the brakes can be applied once the power has been removed to stop movement of the machines. In alternate embodiments, the brakes can be applied immediately, or after power is removed, or before. The "i_o_9_6" node or device is an input/output controller for transferring command signals in and out of the system, usually from other systems, e.g., light and/or power switches, or other system components. In one embodiment, there can be multiple channels of on/off switches for turning on and off different types of equipment or devices, e.g., lights, object movement machines, etc. The "shop console" node or device is a display that can be viewed by an operator. The "server" nodes or devices can correspond to computing devices or systems having a large storage capacity (e.g., hard drives) that can handle more robust computing tasks than other, smaller, computing devices having less storage capacity.

In another exemplary embodiment, a 'global node' can be provided that collects information and saves all machine data to a central location for later back up of that data. For example, the global node or device can show a display of those nodes or devices in the system that have a friction load (e.g., those nodes or devices that are associated with the movement of objects).

Figures 6, 11:
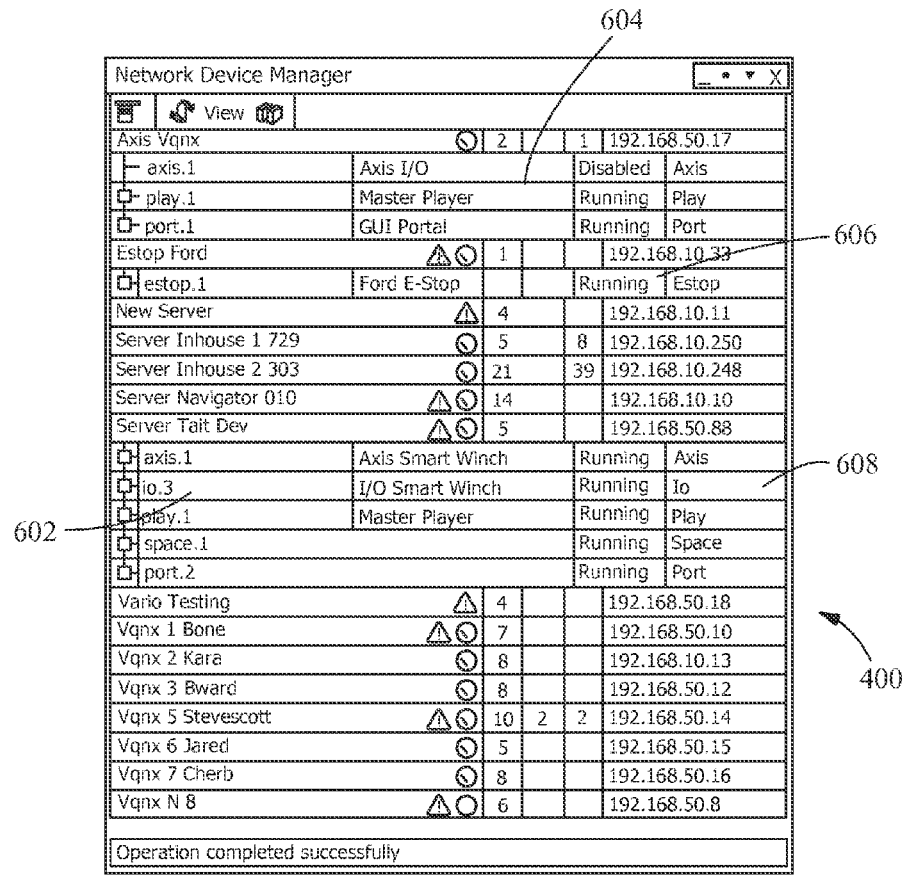

As indicated above with regard to FIGS. 4 and 5, a node or device can be a multi-tasking computing device to simultaneously execute several sub- or co-processes. FIGS. 6 and 7 show exemplary embodiments of process lists under particular nodes or devices. FIG. 6 is similar to FIG. 4 and FIG. 7 is similar to FIG. 5 except for the inclusion of lists of sub- or co-processes under select nodes or devices. As shown in the differences between FIGS. 4 and 6 and FIGS. 5 and 7, the nodes and devices and corresponding sub- or co-processes can be organized in a "tree" structure that can be expanded to provide the appropriate view. In one embodiment, an operator can select a node or device, e.g., "double click," to cause the expanded display that lists the sub- or co-processes associated with the node or device. The name of each sub- or co-process can be provided in column 602 and a description of the corresponding sub- or co-process can be provided in column 604. Column 606 provides the status of the corresponding sub- or co-process, e.g., running, disabled or inactive. The type or class of sub- or co-process can be provided in column 608. In one exemplary embodiment as shown in FIG. 7, the "axis_shop_ne" node or device includes 3 sub- or co-processes, 2 active or running sub- or co-processes and 1 disabled sub- or co-process. The two active sub- or co-processes are "axis.1" and "play.1" and the disabled sub- or co-process is "port.1." In one exemplary embodiment, a node or device can execute multiple instances of the same (or similar) type of sub- or co-process at the same time. For example, the "Server Tait Dev" node or device shown in FIG. 6, includes both a "port.1" sub- or co-process and a "port.2" sub- or co-process.

FIG. 8 schematically shows an exemplary embodiment of a sub- or co-process. Each sub- or co-process 320 includes one or more actions 804 that can be triggered by one or more rules 802 and/or one or more cues 806 or by a direct command from an operator console interface 215. In another embodiment, one or more cues 806 can trigger one or more rules 802 or one or more actions 804 can trigger one or more rules 802. For example, one or more rules 802 can initiate one or more actions 804 in response to one or more cues 806.

In one exemplary embodiment, each rule 802 can be an if-then or an and-or statement or other similar type of case or logic statement. The cues 806 can be associated with the "if" conditions of the rule and can include measured parameters, e.g., velocities, accelerations, positions, voltages, currents, etc., and logic inputs, e.g., "1s" or "0s," from other nodes or devices. The actions 804 can be associated with the "then" portion of the rule and can include controlling an operating speed of the machine(s) associated with the node or device, sending messages or commands to other nodes or devices, changing operational status, e.g., on or off, of system components, e.g., lights, relays or switches.

In one exemplary embodiment, an axis process can be a software algorithm executed on the microprocessor of a corresponding node to generate instructions to move a motor on a winch to wind or reel. For example, if an instruction is given to move a theatrical object at the end of a cable of a winch a total of 30 feet at 4 feet per second and then stop (see e.g., FIG. 21), the axis process can perform all of the calculations required to generate the voltages and currents necessary for the motor to accomplish the desired cable movement.

Figures 9, 10:
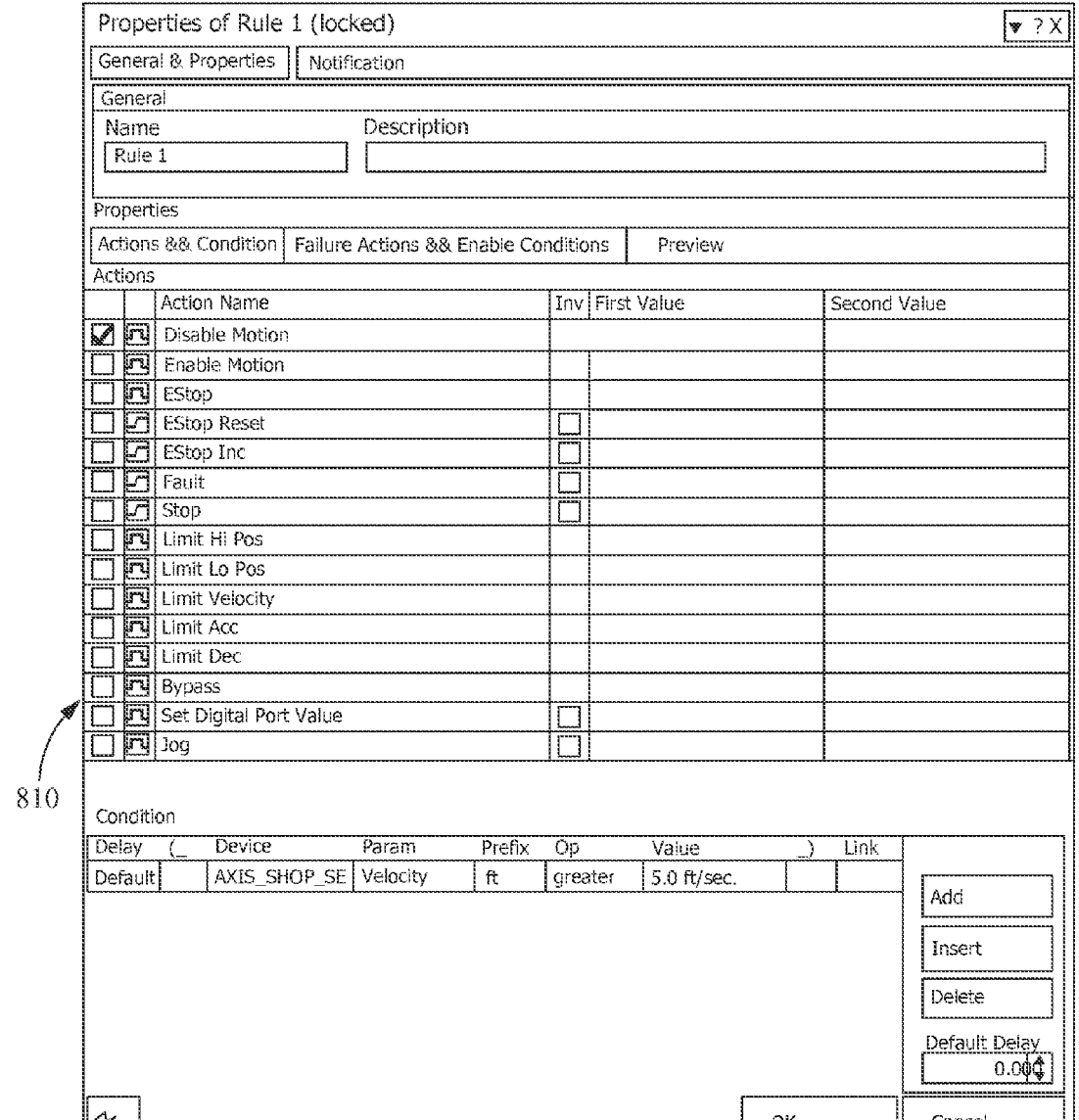
FIG. 9 shows an exemplary embodiment of a screen display from the control system for setting properties for a rule for a device.
FIG. 10 shows an exemplary embodiment of a screen display from the control system showing the rule text for a rule created in the interface of FIG. 9.

FIG. 9 shows an exemplary embodiment of a screen display to set properties for a rule for a node or device. An input mechanism 808 can be used with a preselected list of actions 810 to permit an operator to select a desired action and then set the cues for the rule(s) to trigger the action. In the exemplary embodiment of FIG. 9, the input mechanism 808 is setting properties or cues for a rule relating to the "AXIS_S-HOP_SE" node process for the "axis_shop_se" device of FIG. 5. The information entered in the input mechanism 808 can be translated into rule text as shown in FIG. 10. In the exemplary embodiment of FIG. 10, the rule is written to disable the associated machine's motion for the "axis_s-hop_se" device in response to whether the associated machine for the "axis_shop_se" device has a velocity that is greater than five feet per second.

In a one exemplary embodiment, the operational instructions or rules for a node or device can be set in any way desired for any machine at any time in real-time. In an exemplary embodiment, theatrical object movement control can be changed at an operator console from one set up for a stage production having one set of rules to another set up having a different set of rules for a maintenance procedure for the theatrical stage. When a maintenance crew arrives and logs in to the control system, the control system can be configured to set all of the machines so that they will not move any theatrical object faster than 10% of a stage production speed. In contrast, when the stage show crew arrives and logs in, the control system can be configured for the stage production set of rules and the maintenance set of rules are then turned off so that theatrical objects can then move in accordance with the show rules that can permit top speed movement, maximum heights and length and other stage show functionality. In a further embodiment, there can be several sets of universal stage production rules that can be used for a performance.

In one exemplary embodiment, the nodes or devices can have sub- or co-processes that are executed on the node or device. Each sub- or co-process can include one or more threads that correspond to the instructions that are executed in a particular sub- or co-process. For example, in the exemplary embodiment of FIG. 7, the "axis.1" sub- or co-process of the "axis_shop_ne" node or device can generate instructions for the motor operating the winch. The winch instructions can control movement of the cable for the winch. A further explosion or expansion of the "axis.1" sub- or co-process can show all of the threads that are running under that sub- or co-process, including threads for the receiving of instructions, the execution of received instructions, and other aspects of motion control for the sub- or co-process.

FIGS. 11 and 12 show exemplary embodiments of screen displays identifying associated threads for a process. Thread lists 440 can provide or display the threads associated with a selected process thread from a sub- or co-process. FIGS. 13 and 14 show exemplary embodiments of screen displays showing performance data for a thread operating on a node or device. Data table 450 can provide information on the operation of a thread, including minimums, maximums and averages on preselected performance parameters. The thread lists 440 and data tables 450 can be used to monitor data relating to the execution of threads on each node or device.

In the exemplary embodiment shown in FIG. 12, the thread list 440 shows the threads for process thread "126994" relating to the "axis.1" sub- or co-process on the "axis_shop_nw" node or device. The number of threads can vary depending on the sub- or co-process. For example, the "Device Driver" thread can convert motion commands into voltage and frequency commands for the motor to operate the motor at certain speeds. The "Axis DAC" thread can be a digital to analog converter that receives a digital signal from a corresponding sub- or co-process or thread and converts the digital signals into analog control signals. If anything changes on the node or device, a management thread of the node or device can ensure that all the other nodes or devices on the network can be informed as to the change.

In the exemplary embodiment shown in FIG. 14, data table 450 shows the device performance relating to thread "126994" for the "estop.1" sub- or co-process of the "estop_shop_03" node or device. Data table 450 can show the starting date and time for the sub- or co-process. In another exemplary embodiment, similar information can be provided or displayed for all the sub- or co-processes of the other nodes or devices. The performance data from a sub- or co-process can be made available to all the other nodes or devices to enable the real-time exchange of information between nodes or devices at any point in time. In the exemplary embodiment shown in FIG. 14, some performance parameters for an exemplary sub- or co-process can relate to device file status, device commands, other statuses, etc. For example, the "Device File Status" row in table 450 of FIG. 14 includes a column that indicates that there is one (1) file that is currently open.

FIG. 15 shows an exemplary embodiment of a table corresponding to a data vector used to exchange information among nodes or devices. In the exemplary embodiment shown in FIG. 15, a table 460 for the "Server Tait Dev" device in FIG. 4 includes information that can be exchanged with other nodes or devices. The "type" column 462 shows the kind of string, and the "value" column 464 depicts a rule state or corresponding value for a parameter in the data vector.

The data vector can be used to permit the control system to be customized for the requirements of a particular theatrical event. For example, the features of the graphical user interface (GUI), e.g., information, presentation, filtering, conditional displays, conditional color coding, conditional access, conditional actions and performance limiting measures ("rules"), the ability to write, record, edit, re-order, re-structure, and segregate the playback sequences at will, and the provision for any number of operator interfaces with multiple login levels to have access to the system simultaneously can all be customized for the event.

Figure 16:
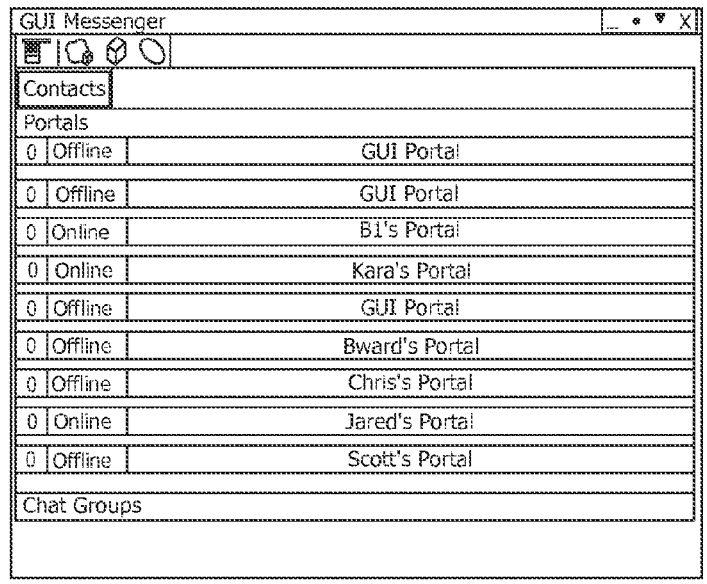
FIG. 16 shows an exemplary embodiment of a screen display from the control system showing a graphical user interface messenger for an operator console.

FIG. 16 shows an exemplary embodiment of a graphical user interface messenger for an operator console node. The messenger 480 can be used to identify and list the operator console nodes 215 in the control system. In one exemplary embodiment, an operator console node 215 is not the actual central point of control in the control system 100 due to the networking and sharing of data vectors. The control system 100 has universally available real time data about the operational status of each node or device, but does not have a central point of control. Since the operator console node 215 is not the central point of the system, numerous operator control nodes 215 can be incorporated into the system in any configuration desired at any time. For example, simultaneously used operator controls can be provided to a desktop computer, a palm top computer, a floor mounted graphical user interface, a laptop computer, a hand-held computer, a console device, etc. In one exemplary embodiment for a theatrical stage environment, there may be five consoles, three laptops, eight palm top computers, all of which can access the data vectors being generated in real time all the time. Any operator console node 215 can display any data for any specific node, device or process because there is no centralized data processing, but rather all data processing is decentralized.

Figure 17:
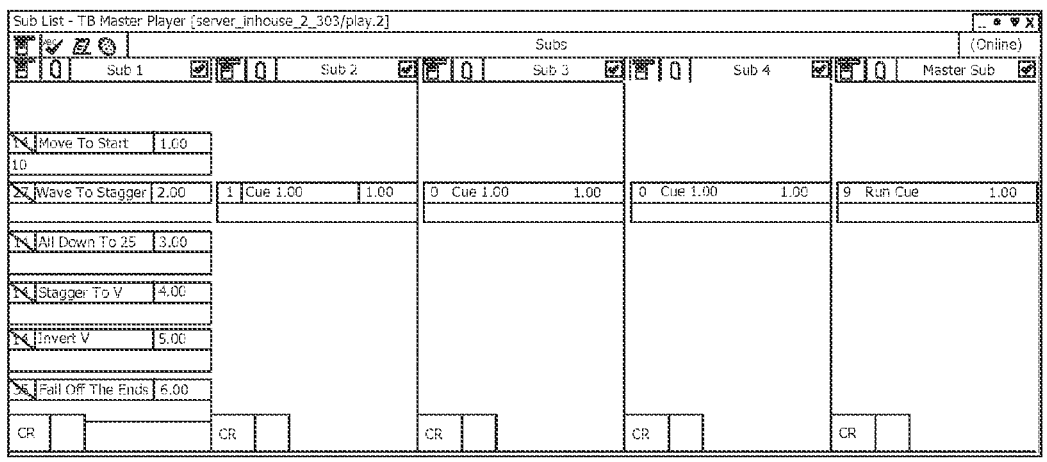
FIG. 17 shows an exemplary embodiment of a screen display from the control system showing sequential motion sequences.

FIG. 17 shows an exemplary embodiment of a screen display showing sequential motion sequences or profiles. For example, a motion sequence or profile can include a main curtain being moved out, scenery being moved in and the drop of a main lift in the downward direction. The sequence of instructions for the motions to be performed can be organized into a cue. The cue can be executed by a "player" process. The "player" process can include one or more lists of one or more cues. Each list of cues can be arranged into a "submaster" player. The individual actions or instructions within the submaster player corresponds to the list of actions and instructions in each of the cues that form the list of cues for the submaster player. A "master" player can be used to execute cues from other submaster players. Any sequence of theatrical object movements can be executed, by demand of an operator, any time during a stage production by selecting particular cues from particular submaster players.

In another exemplary embodiment, the "player" process can "play" a list or cue of motion commands. The motion commands can provide rules or instructions to an axis node or device based on the conditions set by the rule. For example, the rule may specify limitations on velocity, position or location, whether the axis device or node is enabled or disabled, and when and whether the axis node or device is to stop its movement. The instructions that are performed by the axis node or device can be dependent upon the conditions that have been satisfied. When a condition is satisfied, the axis node or device "goes active" and performs those instructions that are permitted by that satisfied condition.

The conditions set by the rules allow for the movement of the axis nodes or devices to be coordinated and interrelated to one or more other nodes or devices. For example, there can be one axis node that can be assigned to each of a number of winches that wind and unwind respective cables. A node may also be assigned to a supervisory safety system which monitors the status of each of the winches to ensure compliance with all expected statuses. The supervisory safety system node can turn off power to any winch that is non-compliant with its expected status. There may also be two nodes assigned to an "operating controller." The operating controller can monitor data from each winch, share that data with all other axis nodes or devices, and display the data for an operator. The movement and status of each machine assigned to an axis node can be related to both itself and to the movement and status of each other machine that is assigned to that respective axis node.

In one embodiment, exemplary conditional movement rules can be associated with the winding and unwinding of a "First Winch." For example, when the First Winch is executing a winding motion, but its winding speed is below a maximum speed and the end of the cable being wound by the First Winch is located farther away than a minimum separation from the end of a second cable of a "Second Winch," then the First Winch will stop and unwind its cable by a predetermined length. The end of the cable of the First Winch can be controlled as to permissible lengths with maximum positions and maximum speeds, such as by setting a limit on a maximum velocity of the winding of the cable so as to be based upon the velocity of the end of the cable of another winch that is assigned to another node in the system.

A space control sub- or co-process ("space device") can be implemented into a node or device to control and/or simulate one or more three dimensional (3-D) motion systems in a predefined space. In addition, the space control device can also display the movement or operation of the 3-D motion system(s) in the predefined space while in operation. The space control node or device enables a user or operator to work with sets of interrelated axis nodes or devices (machines), where arguments or cues for the axis nodes or devices are executed by "player processes." Each argument or cue can have lists of motion groups or routines that define what list each motion group is in, which sub-list the motion group is in, and which cue the motion group is in. Constructs can be programmed to incorporate, integrate and interrelate multiple machines/axis nodes or devices to a single point of control. In one embodiment, the single point of control can correspond to the center of mass or center of gravity of the object to be moved by the 3-D motion system. In another embodiment, the single point of control can correspond to another point separate from the center of mass or center of gravity. An operator can then control and manipulate that single point in a three dimensional space so as to control various movement aspects of each of the machines/axes in that single point of control. In one exemplary embodiment, the motion of the machinery can be displayed via a 3-D graphic model to enable an operator to witness the position of all equipment or axes in motion (even if there is no line of sight) by adjusting viewing angles in the 3-D graphic model.

Figure 18:
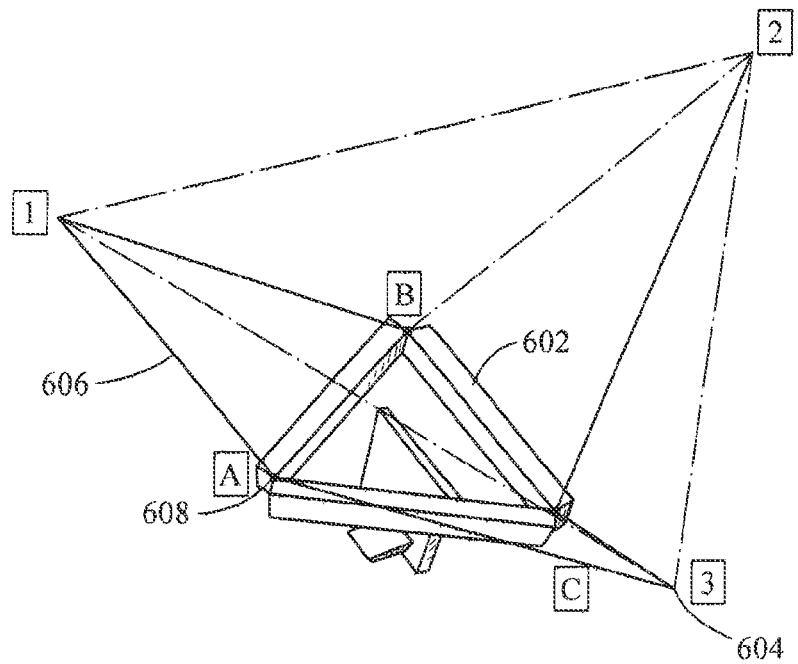
FIGS. 18-20 show different views of an exemplary embodiment of a three dimensional motion system.
Figure 19:
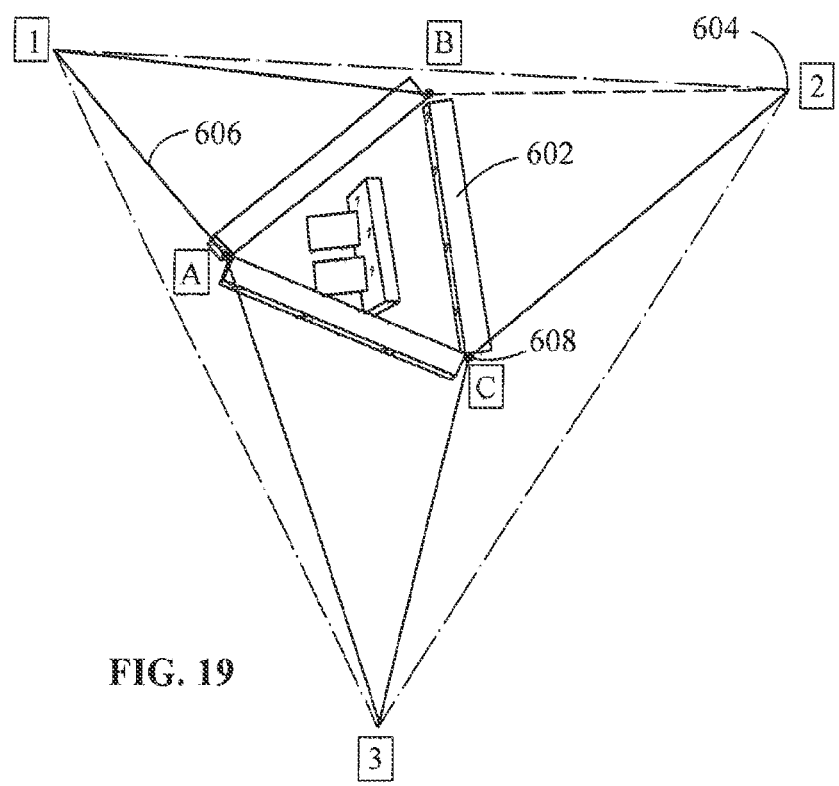
Figure 20:
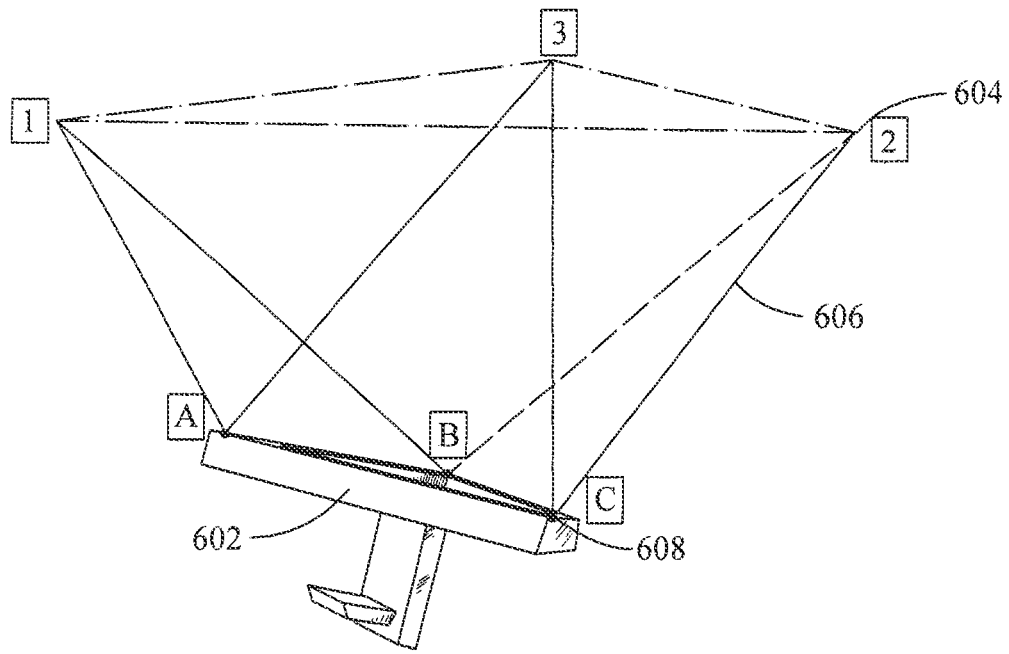

FIGS. 18-20 show different views of an exemplary embodiment of a 3-D motion system having six degrees of freedom. Specifically, FIG. 18 shows a perspective view of the 3-D motion system, FIG. 19 shows a top view of the 3-D motion system, and FIG. 20 shows a side view of the 3-D motion system. Additional information on the operation of a 3-D motion system having six degrees of freedom can be found in U.S. Patent Application No. 61/489,741, which application is hereby incorporated by reference into the Application.

The space device can permit an operator to monitor and display simulations of automation or motion routines (before sending the routines to the nodes or devices for execution) or, after sending the motion routine to the nodes or devices for execution, i.e., to generate operational commands, to monitor and display the actual motion of the system. When simulating the automation or motion routines, the simulation can occur within the space device or the associated nodes or devices can simulate the automation or motion routines and send the resultant data from the simulation back to the space device. If the node or devices are executing the automation or motion routine, the nodes or devices can send their resultant data from executing the routine back to the space device. In one embodiment, the automation or motion routines can be written and tested virtually to monitor the 3-D motion system and to view the 3-D motion system from all angles. If the automation or motion routine is acceptable, the routine can be switched from simulation at the nodes or devices to execution at the nodes or devices for subsequent playback and inclusion in the performance cue list.

Figures 21, 22:
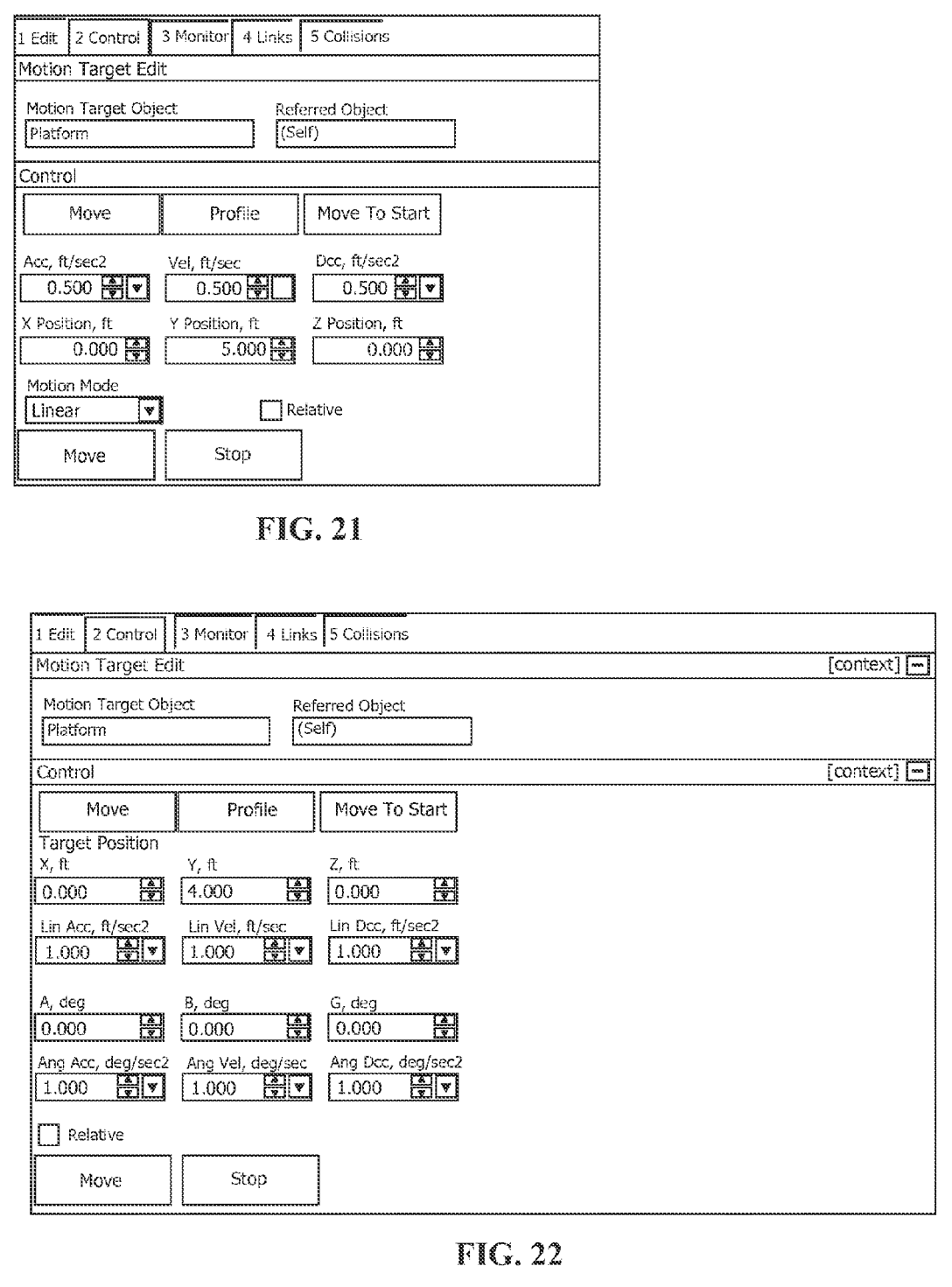

FIGS. 21 and 22 show exemplary embodiments of different interfaces for entering a point-to point motion profile or routine into a three dimensional (3-D) motion system. FIG. 21 shows the interface for entering X, Y, and Z coordinates to move from the object's current position to the defined X, Y and Z coordinates. FIG. 22, shows the interface for entering X, Y, and Z coordinates and alpha, beta and gamma angles to move from the object's current position and orientation to the defined X, Y and Z coordinates and alpha, beta and gamma angles. In addition, acceleration, deceleration and velocity parameters can be entered for both the coordinates and the angles.

In one exemplary embodiment, the X, Y and Z coordinates can be based on X, Y and Z axes associated with the predefined space. The X, Y and Z axes can be pre-assigned by the control system or can be assigned by the operator. The X, Y and Z coordinates for an object in the predefined space correspond to the coordinates for the object's single point of control relative to the origin of the X, Y and Z axes in the predefined space. The X, Y and Z coordinates give the position of the object in the space.

Figure 23:
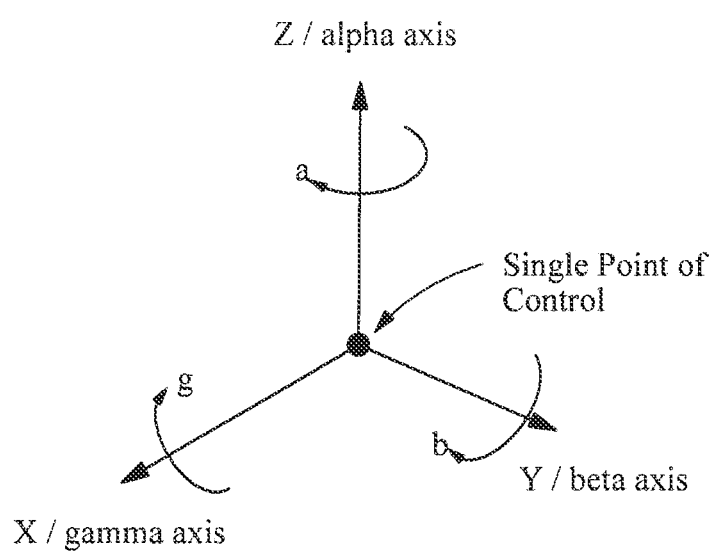
FIG. 23 shows an exemplary embodiment of a coordinate system for an object moved in the three dimensional motion system.

In another exemplary embodiment, the object can have another set of X, Y and Z axes that are associated with the object itself. The object X, Y and Z axes may or may not correspond to the X, Y and Z axes for the predefined space. As shown in FIG. 23, the object X, Y and Z axes for the object are defined from the single point of control for the object. In one embodiment, the positive X axis for the object can correspond to the forward direction of travel for the object, the positive Y axis for the object can correspond to the leftward direction (relative to the positive X axis) of travel for the object, and the positive Z axis for the object can correspond to a upward direction of travel for the object. The alpha angle can be measured relative to the Z axis for the object, the beta angle can be measured relative to the X axis for the object, and the gamma angle can be measured relative to the Y axis for the object. The alpha, beta and gamma angles give the orientation of the object in the space.

The alpha or yaw angle is the angle of rotation of the object around the Z axis (up-down axis) for the object. A reading of zero is given when the object is pointing in the same direction as the X axis for the object. Positive angles of rotation can be measured as clockwise deflections and can be a value between 0 and 360 degrees. The beta or pitch angle is the angle of rotation of the object around the Y axis (side-to-side axis) for the object. A reading of zero is given when the object is essentially parallel to the X-Y plane for the object. Positive angles of rotation are measured as clockwise deflections, negative angles of rotation are measured as counterclockwise deflections. Angles are measured in degrees and can take any value between −360 and 360 degrees. The gamma or roll angle is the angle of rotation around the object's X axis (front-back axis). A reading or measurement of zero is given when the object is essentially parallel to the X-Y plane for the object. Positive angles of rotation are measured as clockwise deflections, negative angles of rotation are measured as counter-clockwise deflections. Angles are measured in degrees and can take any value between −360 and 360 degrees.

FIGS. 24 and 25 show exemplary embodiments of different editors for entering or creating motion profiles for a three dimensional motion system. The motion profile can be a series of positions and/or orientations that define a path for an object to travel in the predefined space. The starting point (position and/or orientation) can be defined by the operator or can be the last known position and/or orientation of the object, e.g., the ending point from a previous motion profile. In the motion profile of FIG. 25, the X, Y and Z coordinates for each position in the path to be travelled by the object from a starting location and the corresponding time instance or parameter for each position can be entered by the operator or user. In the motion profile of FIG. 24, the alpha angle, the Y coordinate and the gamma angle and the corresponding time instance for each position and orientation can be entered by the operator or user for the path to be travelled by the object, while the X coordinate, Z coordinate and the beta angle do not change from the object's starting position and orientation. In another embodiment, the user or operator can manually control the nodes or devices to move an object along a user controlled path and record the positions and orientations of the object either at preselected time intervals or user initiated time intervals. The recorded positions, orientations and times from the user controlled operation can be imported into the space device and configured as a motion profile.

The time parameter can be assigned by an operator to correlate particular positions and/or orientations to particular instances in time. When time parameters are defined for a particular path, the acceleration, deceleration and velocity parameters between positions and/or orientations can be automatically calculated. In another embodiment, a beginning and ending time can be defined and the remaining time instances can be calculated for the corresponding positions and/or orientations in the path. Further, the time instances, once defined can be automatically scaled if a longer or shorter overall time is desired.

In one embodiment, once the motion path or profile for the object is defined, the path or profile can be provided to the corresponding nodes or devices for simulation or execution of the specific commands (once calculated) by the nodes or devices. By having the nodes or devices simulate or execute the specific commands required by the path and then displaying the path in the space device, the path can be modified in real-time by adjusting the path displayed in the space device. In another embodiment, the calculation of the specific commands to be executed by the nodes or devices can be precalculated and provided to the nodes or devices. If the specific commands to be executed by the nodes or devices are precalculated, the path cannot be modified in real-time.

In the space device, there can be static elements, i.e., elements that do not move in the predefined space, and motion elements, i.e., elements that move or cause movement in the predefined space. The user or operator can define the location of static elements, e.g., walls, columns, fixed scenery items, etc., in the predefined space. Once the static elements are defined, the location of the static elements can be used for different purposes including collision detection with motion elements. The motion elements can be used in conjunction with the motion path or profile to create and/or implement the specific actions of the components needed to enable the object to travel the path defined by the motion profile. The motion elements can include the object to be moved, engines, which can correspond to a 3D model of an axis device, laces, which correspond to the items used to connect the engines to the object to be moved, lace attachment points on the object to be moved. For example, in the 3D motion system shown in FIGS. 18-20, for the object to be moved 602, there can be three or more engines 604, six or more laces 606, and three or more lace attachment points 608. In another embodiment, the 3-D motion system can include other devices such as pulleys, anchors or shivs that can be used to alter the configuration or orientation of a lace connected between the engine and the lace attachment point.

The engines 604 can have corresponding positions in the predefined space. The corresponding positions can be fixed or can move relative to the predefined space, such as the engine being on a trolley and track. The lace attachment points 608 can be integrated into the object to be moved 602 and have corresponding positions in the predefined space. The changing of the position of the lace attachment points 608 in the predefined space can be used to change the position or orientation of the object to be moved 602. Laces 606 can be connected to the lace attachment points 608 and can be used to exert the force to move or change the position of the lace attachment point 608. Each lace 606 can be defined by several different parameters, including a starting point or 3D position, a length and an ending point on the attached object. The starting point for the lace 606 can correspond to the location or position of the engine 604 associated with the lace 606. The ending point for the lace 606 can correspond to the associated lace attachment point 608 where the lace 606 is connected to the object to be moved 602. All of the parameters associated with the engines 604, the laces 606 and the object attachment points 608 can be factored into the calculations for the specific commands to implement a path. In addition, each of the engines 604, laces 606 and lace attachment points 608 have to be related to one another, such as a lace 606 being associated with an engine 604 and a lace attachment point 608. For example, when the object to be moved 602 changes position in the predefined space, one or more laces 606 can have corresponding parameter changes such as lengths and ending positions. Some of the lace lengths may become longer while other lace lengths may become shorter.

Figure 26:
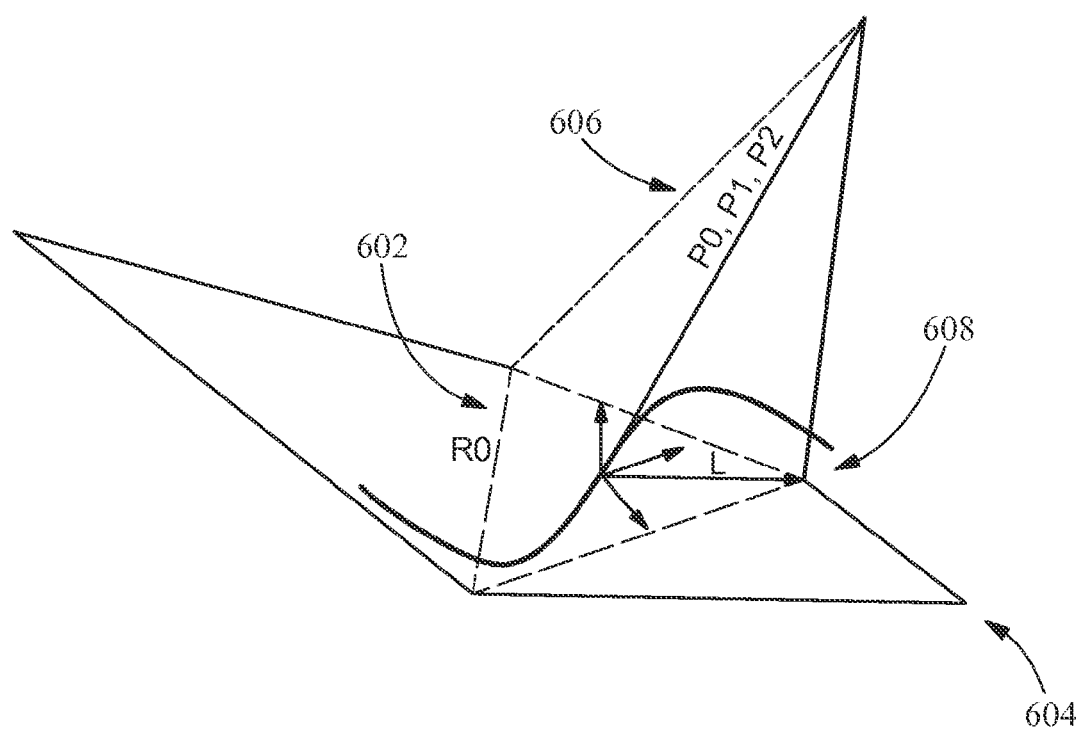
FIGS. 26 and 27 show exemplary representations associated with the motion control algorithm.
Figure 27:
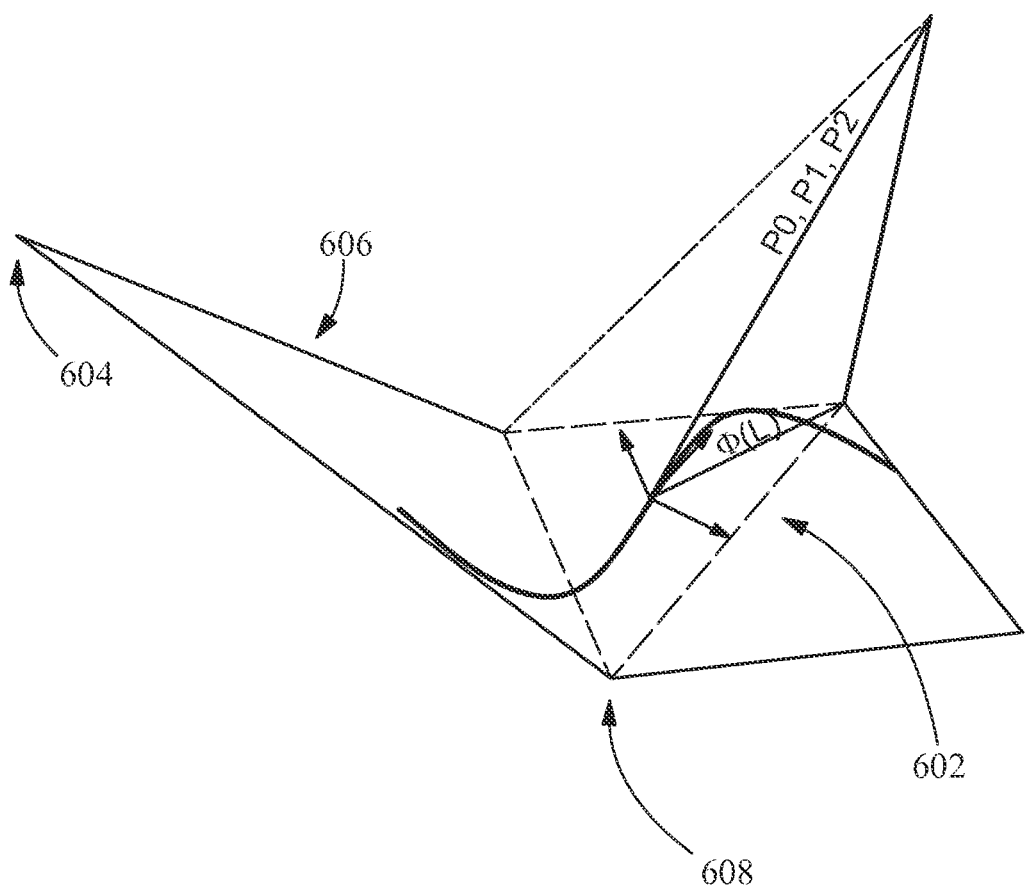

In one exemplary embodiment, an algorithm can be used to control the motion of the object in the predefined space by adjusting, according to a profile, the lengths of individual ties that bind the motion object to the environment. A tie can be a flexible line, e.g., lace 606, a solid actuator, e.g., engine 604, or any other type of non-stretching, straight line binding that is applicable with respect to the laws of physics. FIGS. 26 and 27 show exemplary representations associated with the motion control algorithm.

The motion of the object can be a combination of translational, e.g., forward, motion and/or rotational motion about the object's local coordinate system origin to provide six degrees of motion (6D motion) for the object. The 6D motion can be described by a multi-dimensional cubic spline $\overline{P_i(t)}$: $\overline{P_i(\tau)} = \overline{A_i}\tau^3 + \overline{B_i}\tau^2 + \overline{C_i}\tau + \overline{D_i}$ with $i\in[0; N)$ where N being the number of spline segments of duration $\tau_i$, $\tau$ being zero based time value in ith segment $\tau\in[0; \tau_i)$, $\overline{P_i(\tau)}\in\Re \to \Re^{3+r}$ being placement of motion object at time $\tau$ with first 3 coordinates ($P_{i,0}(\tau)$; $P_{i,1}(\tau)$; $P_{i,2}(\tau)$) denoting Cartesian location and the rest r coordinates denoting arguments to affine rotation function $$\Phi(R_0, P_{i,3}(\tau), \ldots, P_{i,3+r-1}(\tau), \overline{x})$$

$\in\Re^3 \to \Re^3$, and $\overline{A_i}, \overline{B_i}, \overline{C_i}, \overline{D_i} \in \Re^{3+r}$ being spline coefficients. The boundary conditions to the spline can be given as either first derivative values at the ends or second derivative values at the ends or any two values chosen from the first or second derivative values at the ends. The number of orientation argument splines r can vary from 0 to 4 (or more) depending on chosen rotation function $\Phi$ which defines orientation coordinates meaning (either YPR or GEO or any other). Additionally, function $\Phi$ may use a constant parameter affine rotation matrix $R_0 \Re^3 \times \Re^3$ to define zero-orientation for the coordinate system.

The profile can be the tie length controlling function in the form of the cubic spline segments sequence $p_j(\upsilon) = a_j\upsilon^3 + b_j\upsilon^2 + c_j\upsilon + d_j$ with $j\in[0; M)$, where M can be the number of spline segments of duration $\upsilon_j$ such that $$\sum_{j=0}^{M-1} \upsilon_j = \sum_{i=0}^{N-1} \tau_i,$$

$\upsilon$ can be the zero based time value in jth segment $\upsilon\in[0; \upsilon_j)$, $p_j(\upsilon)\in\Re \to \Re$ can be the length measure of the tie at time and $a_j, b_j, c_j, d_j \in \Re$ being the spline coefficients. The boundary conditions for $p_j(\upsilon)$ are chosen to satisfy the requirements for the first and second derivatives obtained from motion spline $\overline{P(t)}$ at segment beginnings. The spline segments $p_j(\upsilon)$ may have discontinuities at the end points of each segment $j\in[0; M)$. However due to $\upsilon_j$ being chosen very small, the effect of discontinuities on the motion is imperceptible.

The purpose of the algorithm is to generate a tie length change profile such that the tie lengths of $p_j(\upsilon)$ and their first, second and third derivatives $$\frac{\partial p_j(\upsilon)}{\partial \upsilon},$$

$$\frac{\partial^2 p_j(\upsilon)}{\partial \upsilon^2}$$

and $$\frac{\partial^3 p_j(\upsilon)}{\partial \upsilon^3}$$

at time 0 of each segment $j\in[0; M)$ would be in agreement with the motion spline $\overline{P(t)}$ at respective times so that the algorithm can make the motion object position/orientation closely follow the prescribed trajectory if driven by the tie in the prescribed manner.

The algorithm can have the following inputs: $\overline{L}\in\Re^3$—the offset vector from motion object's origin to tie connection point in local coordinate system of the object; $R_0\in\Re^3 \times \Re^3$—the affine rotation matrix defining zero-orientation for chosen rotation function $\bar{\Phi}$; and $\overline{P(t)}$—the motion spline with 3 location coordinates being in the form of relative offsets from the tie's environment binding point to the requested motion object's origin location and r orientation coordinates being inputs to chosen rotation function $\bar{\Phi}$.

The offset vector from the tie's environment binding point to the tie's binding point on the motion object can be calculated as $$\overline{V_i(\tau)} = \overline{(P_0(\tau); P_{i,1}(\tau); P_{i,2}(\tau))} + \overline{\Phi(R_0, P_{i,3}(\tau), \ldots, P_{i,3+r-1}(\tau), \bar{x})}$$

and hence, the tie's length can be calculated as $p_j(\upsilon)=|\overline{V_i(\tau)}|$ where j and $\upsilon$ are agreed to match absolute time from start of the motion as defined by i and $\tau$. Having calculated $p_j(\upsilon)$, $$\frac{\partial p_j(\upsilon)}{\partial \upsilon},$$

$$\frac{\partial^2 p_j(\upsilon)}{\partial \upsilon^2}$$

and $$\frac{\partial^3 p_j(\upsilon)}{\partial \upsilon^3}$$

at $\upsilon=0$ for each $j\epsilon[0; M]$ the motion guidance parameters (position, velocity, acceleration and jerk) can be obtained.

In one embodiment, $$\overline{\Phi(R_0, P_{i,3}(\tau), \ldots, P_{i,3+r-1}(\tau), \bar{x})}$$

can be a combination of affine rotations and normally is not expressed in analytical form. Its value, as well as the values of its derivatives, are calculated programmatically for the required particular time points without building a general expression for the function itself.

In another embodiment, with $\bar{L}$ being the null-vector of the $\bar{\Phi}$ function, the $R_0$ parameter and $P_{i,3}(\tau); \ldots, P_{3+r-1}(\tau)$ motion spline coordinates do not have any effect on the calculations and can be omitted. In this embodiment, the algorithm becomes the single-point attachment 3D motion control algorithm. With $(P_{i,0}(\tau); P_{i,1}(\tau); P_{i,2}(\tau))$ motion spline coordinates being constants $(D_0; D_1; D_2)$ for all $i\epsilon[0; N)$, the algorithm becomes a rotation-only control algorithm for the motion object origin remaining at a constant point in the predefined space. With $(P_{i,3}(\tau); \ldots; P_{i,3+-1}(\tau))$ motion spline coordinates being constants $(D_3; \ldots; D_{3+r-1})$ for all $i\epsilon[0; N)$, the algorithm becomes a motion-only control algorithm for the motion object origin with object's orientation remaining constant.

In a further embodiment, the algorithm is purely geometric and does not account influence of gravity and inertia of motion object's mass. The gravity force's influence on object's linear and angular acceleration can be compensated for by the rigidness of the ties or their counter-extension forces. The object mass must be minor with respect to the ties' driving power so that inertia's influence on motion would be minor as well.

In another exemplary embodiment, the space device can use a Stewart Platform orientation to support the positional and orientational movements of the object. The Stewart Platform orientation can provide for the placement of the object in the space. The placement of the object can include the location of the object (the 3D coordinates (X, Y, Z) where the object center is located) and the orientation of the object (how the object's local coordinate system is oriented with respect to parent coordinate system). The X, Y, Z coordinates and the alpha, beta, gamma coordinates entered into a motion profile can be converted into Stewart Platform coordinates.

To define a Stewart Platform orientation, a two-component value is used that includes tilt and rotation. The tilt can be a two-component value that includes longitude and latitude. For convenience, the components of the Stewart Platform orientation can be combined into a three-component 3D point format (longitude, latitude, rotation), which is used to describe momentary object orientation and define profiles. The coordinate axes' characters used for orientation are "L" for longitude, "A" for latitude and "R" for rotation (similar to X, Y, Z that describe object's position).

Figure 28:
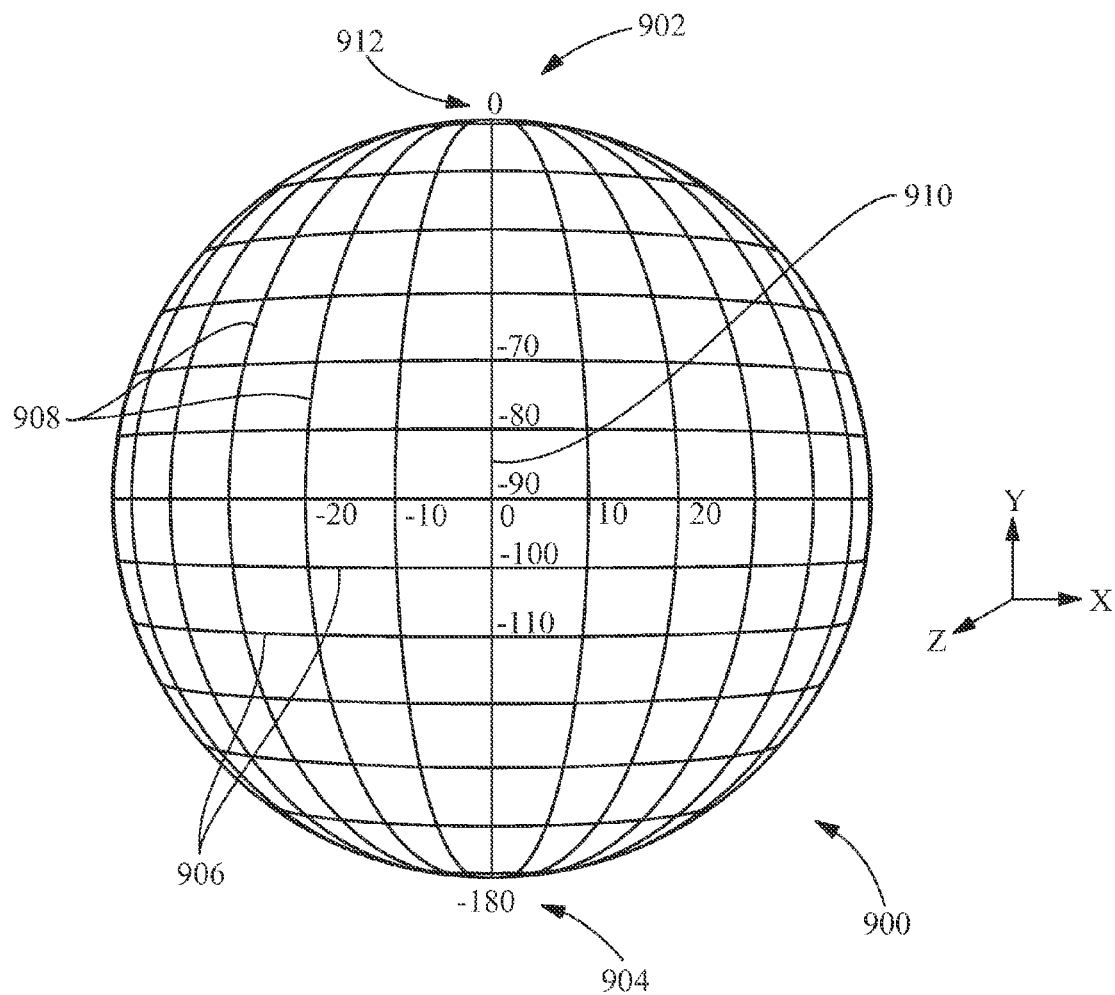
FIGS. 28 and 29 show exemplary embodiments of different representations of Stewart Platform orientations.

The concept of tilt can be demonstrated with a globe with geographical meridians and parallels on its surface as shown in FIG. 28. In FIG. 28, there can be a globe 900 with a north pole 902, a south pole 904, latitude lines or parallels 906 and longitude lines or meridians 908. The zero meridian 910 is the one on frontal side of globe 900 (the closest one to a spectator, in direction of Z+ axis from globe's center) and the meridians' values increase in counter-clockwise direction when considered from north pole 902. The zero parallel 912 is the one at the north pole 902 and the parallels' values decrease towards the spectator by zero-meridian in the direction to the south pole 904. The values of meridians and parallels of tilt are described in angular degrees.

The orientation in FIG. 28 shows a "geographical zero" tilt. This is zero-tilt (0, 0) value defined by the directions of north pole axis (from globe center to zero parallel) and frontal axis (from center to −90 point at zero meridian). Any tilt value (L, A) is obtained from zero-tilt orientation by tilting north pole axis of the globe 900 by A degrees in direction of meridian L. For example, tilt (0, −90) is the orientation with north pole axis rotated straight towards the spectator (by −90 degrees along the zero meridian); tilt (0, 90) is the orientation with north pole axis rotated straight away from the spectator (by +90 degrees along the zero meridian); tilt (−90, 90) is the orientation with north pole axis rotated horizontally to the right (by −90 degrees along the 90-meridian). The same geographical tilt can be obtained with multiple tilt values. For example tilt values (0, 90), (180, −90), (−180, −90) describe an identical tilt orientation—straight away from the spectator. Each tilt orientation is obtained from geographical zero tilt only and with a single rotation operation only, i.e., both L and A rotations occur at the same time. The tilt orientation cannot be considered as first rotating the globe along a meridian by A degrees and then rotating along a parallel by L degrees as such movements would result in a wrong orientation.

In one exemplary embodiment, the zero locations and positive/negative directions can be chosen to make jogging intuitive for an operator. Zero tilt can be straight up to the zenith and if object starts in that state it should have tilt coordinates of (0, 0) corresponding to a zero latitude value at the north pole. Then, if jogging by latitude is desired, the operator can expect that if he/she moves joystick towards himself/herself (to negative values) the north pole 902 would also turn in that direction. Further, the zero longitude meridian 910 can be on the front of the sphere 900 with latitude values decreasing into negative half-axis towards the operator.

Next, the globe surface can be unwound and the polar points stretched into lines in order to present the globe surface as a rectangular area with longitude ranging from −360 to 0 and latitude ranging from −180 to 0, the negative numbers can be chosen for longitude to match the range of latitude being negative. Then by duplicating the rectangular area, the motion plane for the tilt value can be obtained as shown in FIG. 29.

Figure 29:
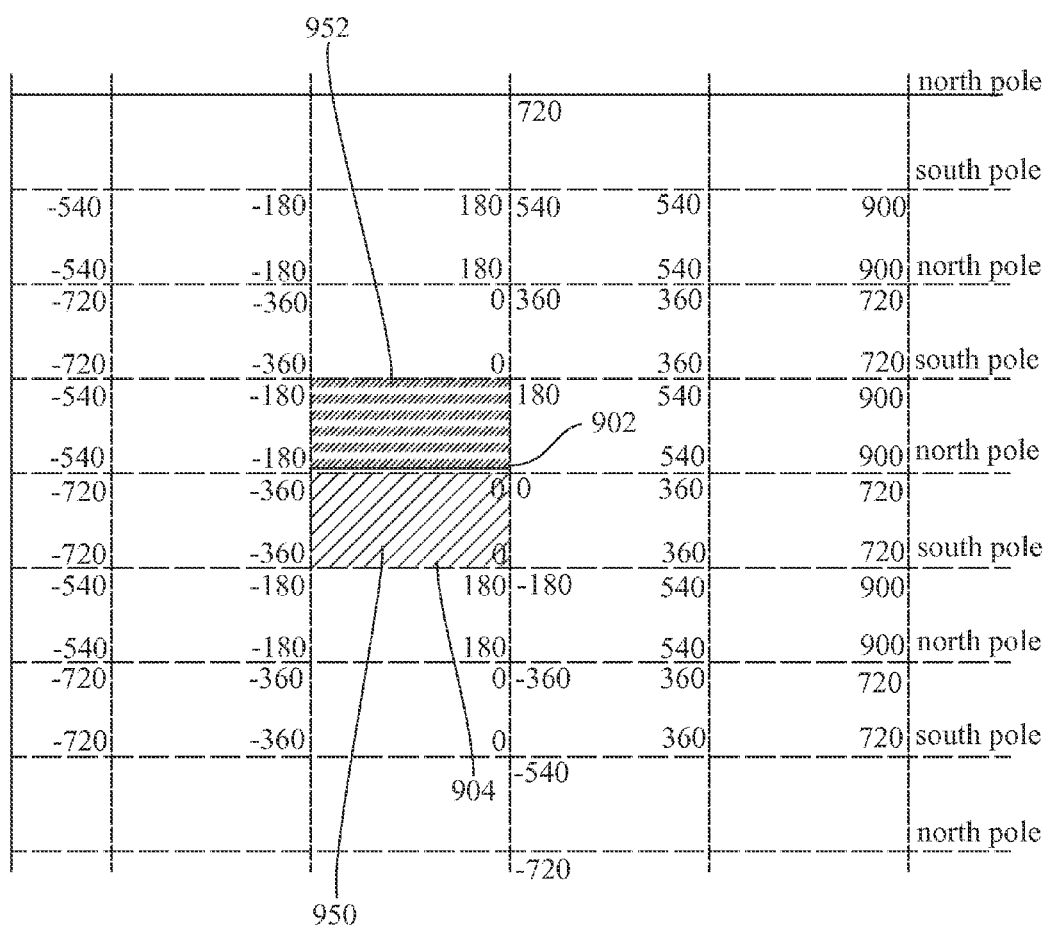

In FIG. 29, the hatch area 950 identifies the plane region that maps to the entire sphere surface. The upper edge of the hatch area 950 maps to the north pole 902, while the lower edge of the hatch area maps to the south pole 904. If a tilt value crosses one of the horizontal polar lines, the actual longitude jumps by 180 degrees, however that is not the problem for determining the motion as the tilt motion trajectory can be built as an arbitrary smooth curve on entire plane while the space and axis drivers can adjust the coordinates internally to account for transitions through polar points. When the space driver calculates object orientation from positions of axis devices, the space driver initially adjusts the result to fall into or be within hatch area 950. Then, as object orientation changes, the space driver tracks the changes and produces near-contiguous tilt values within a primary motion area (hatch area 950) and additional motion area (hatch area 952). The addition of the additional motion area can introduce ambiguity into the object's orientation that is returned but permits intuitively acceptable jogging across the north pole from hatched area 950 into hatch area 952 and backwards. If an object executes an orientation change profile, the profile determined tilt value can be wrapped to hatched area 950 to permit correct orientation error checking. If a move command is executed by an orientation with an absolute target, the current object's orientation is "unwrapped" by a whole number of periods to achieve a minimal travel length (with the exception that a move trajectory is never generated to cross the south pole by default).

Generating a 2D motion curve, at a constant speed, in the horizontal direction on the plane in FIG. 27 would result in a constant angular speed rotation along the current parallel regardless of the latitude value. Similarly, turning the curve in a vertical direction would result in a tilt increase/decrease along the current meridian through the geographical poles.

For a Stewart Platform orientation, it is mechanically [practically] impossible to reach and/or cross the south pole tilt. Therefore, the entire motion can be limited into two horizontal stripes that contain hatched rectangles. However, if there could be attachment types that would allow arbitrary orientation tilt, then there would not be any mathematical limitations to prevent motion across the south pole lines.

The rotation orientation component specifies the amount of rotation in degrees around the object's polar axis after the tilt has been applied to it. Positive rotation is counter-clockwise if considered from north pole.

In one embodiment, since the meridians approach each other and join into a single point at the poles (north pole and south pole), large angular distances by longitude at the poles may correspond to small linear travels along the sphere surface requiring the profiles to be generated with large angular speeds in some time segments and with small angular speeds in other time segments to achieve near-constant orientation linear travel speeds along the sphere surface at the polar areas. In addition, the profiles may require more keypoints to be generated closer in time while travelling in polar areas to achieve finer control over the orientation.

While the above description has discussed the movement of a single object in the predefined space, it is to be understood that the space device can be used to simulate and implement the movement of multiple objects in the predefined space. Each object in the predefined space can have its own motion profile that governs its movements in the predefined space. In one embodiment, an object's motion profile can be defined relative to the predefined space, but in another embodiment, an object's motion profile, as well as position and orientation, can be defined relative to another object. If the object's motion profile is defined relative to another object, the motion profile can be to converted to a motion profile defined relative to the predefined space.

The space device can also incorporate collision detection features to prevent an object from colliding with static elements or another dynamic element, if present. In one embodiment, the collision detection feature can be implemented by defining an "envelope" around each object and then determining if the "envelopes" for the objects intersect or overlap during a simulation of the motion profile(s) for the objects. If an intersection or overlap occurs during the simulation, the operator can be notified of the possibility of a collision if the motion profiles were to be executed and can adjust the motion profile as appropriate. By setting the size of the "envelopes" surrounding the objects, the operator can control the frequency of possible collisions. The use of larger "envelopes" can provide more frequent possible collisions and the use of smaller "envelopes" provides less frequent possible collisions. However, the use of smaller "envelopes" may result in actual collisions during execution if the components have larger error margins than accounted by the "envelope." In one embodiment, the "envelope" can be defined as sphere around the object, while in another embodiment, the "envelope" can be a cuboid or prism. In other embodiments, any suitable geometric shape can be used to define the "envelope" for an object.

In an exemplary embodiment, the control system can be self-healing and self-configuring, i.e., the control system can find paths to route data from each node or device to where that data is needed by other nodes or devices in the system.

In one exemplary embodiment, the data for all nodes or devices, including data relating to the processes for the node or device, can be made universally available to every other node or device on the network all the time, so that every node or device is aware of the other nodes or devices. With regard to the transfer of data, there are no processor boundaries, and data is not deemed to reside on separate processors. If one node or device is controlled so as to care whether or not another node or device is going too fast, the corresponding data can be known by the node or device because all nodes or devices are constantly trading information via information packets (e.g., IP protocol packets) containing one or more data vectors. In one embodiment, the data can be stored, and made available to all the nodes, in a markup language format (e.g., eXtensible Markup Language—XML).

In another exemplary embodiment, nodes can share data with all the other nodes on the network using a redundant, load sharing, real time network that can reroute data traffic around damaged sections and alert operators to problems on the network. Each node is capable of storing all of the information the node requires to perform its role. Nodes can communicate with each other their current status (position, movement status, direction, velocity, health of the node, how long has it been in service (length of service), how much has it been used (amount of use)). When one node has a problem, the other nodes can know about the problem immediately and can be programmed on how to react to the problem/failure. For example, one of the elevators in a theatrical production is ten feet high in its raised position and a performer is supposed to be flown by a winch across the space occupied by the elevator. The control system can be programmed so that the winch knows not to move the performer if the elevator is raised or the control system can be programmed to tell the winch to do something entirely different if the elevator fails to retract, e.g., change trajectory.

In an exemplary embodiment, the control system can use the QNX real time operating system (O/S). QNX O/S is a Unix-like real-time micro kernel O/S that executes a number of small tasks, known as servers. The micro kernel allows unneeded or unused functionality to be turned off simply by not executing the unneeded or unused servers.

In one exemplary embodiment, the control system can be architected so that there can be no single point of failure. In other words, there is no single failure that can cause a dangerous condition to occur. One failure may cause an object to stop movement or otherwise not work correctly, but such a failure will not cause a dangerous situation such as a runaway stage prop. The control system can incorporate rigorous mechanical and software analysis standards, including fault analysis and failure mode effect analysis that can simulate failures at different branches of a tree-like system structure. The control system can predict what will happen in different failure scenarios. If a single point of failure is found, the rules can be reset to avoid the single point of failure.

In one embodiment, the control system can integrate a flexible e-stop solution to simplify the configuration and deployment of the safety function. The multiport enabled e-stop controllers used in the control system can be set up to permit easy deployment of e-stop stations. An e-stop station can be placed anywhere on the network where one is required and configured so that the e-stop station can signal single or multiple nodes or devices. The control system e-stop immediately places the equipment or machines in a safe state by removing energy (electric, hydraulic, pneumatic) to the equipment or machine. If a single node or device is being problematic, that node or device can have its e-stop signal disabled without taking down the rest of the control system.

The present application contemplates methods, systems and program products on any machine-readable media for accomplishing its operations. The embodiments of the present application may be implemented using an existing computer processor, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions. Software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A computer implemented method to control the movement of an object in a predefined space, the method comprising:

establishing a starting point for an object in a predefined space using an operator console node, the starting point defining a position and an orientation of the object in the predefined space;

determining a motion profile for the object using the operator console node, the motion profile including a plurality of points and being used to move the object along a path beginning at the starting point, the motion profile having a position and an orientation for the object at each point of the plurality of points along the path;

converting the motion profile into a plurality of control instructions for at least one component associated with the object using a node controlling the at least one component, the at least one component being a plurality of components and defining a relationship between the object and the plurality of components using the operator console node, the plurality of control instructions enabling the at least one component to move the object along the path; and connecting a component of the plurality of components to a connection point on the object with at least one lace using the operator console node;

generating the plurality of control instructions by calculating changes in lengths of laces connecting the object and the plurality of components moving the object along the path with the at least one component in response to the execution of the plurality of control instructions by the at least one component.

2. The computer implemented method of claim 1 wherein said determining a motion profile comprises establishing an end point for the path using the operator console node, the ending point defining a position and orientation of the object in the predefined space.

3. The computer implemented method of claim 2, wherein said converting the motion profile comprises calculating a plurality of control instructions to move from the starting point to the ending point using the node controlling the at least one component.

4. The computer implemented method of claim 1 wherein said determining a motion profile comprises establishing the plurality of points for the object along the path with a user interface.

5. The computer implemented method of claim 4 wherein said establishing the plurality of points for the object comprises manually entering by a user, position coordinates and orientation coordinates for each point into the user interface.

6. The computer implemented method of claim 1 further comprising:
simulating a movement of the object in the predefined space using the node associated with the at least one component; and
displaying the simulated movement of the object for a user in the operator console node.

7. The computer implemented method of claim 1 further comprising displaying a movement of the object in the operator console node as the object is moved along the path by the execution of the plurality of control instructions by the at least one component.

8. The computer implemented method of claim 1 wherein the position of an object includes an x coordinate, a y coordinate and a z coordinate and the orientation of an object includes an alpha angle, a beta angle and a gamma angle.

9. The computer implemented method of claim 8 wherein the x coordinate, the y coordinate and the z coordinate of the object are defined relative to a set of axis defined for the predefined space and the alpha angle, the beta angle and the gamma angle of the object are defined relative to a second set of axis defined relative to a single point on the object.

10. The computer implemented method of claim 1 further comprising determining possible collision events for the object by processing the path for the object and a relationship between the object and the plurality of components.

\* \* \* \* \*